US011091586B2

(12) United States Patent
Crawford et al.

(10) Patent No.: US 11,091,586 B2
(45) Date of Patent: Aug. 17, 2021

(54) POLYESTER COMPOSITIONS WHICH COMPRISE TETRAMETHYL CYCLOBUTANEDIOL AND ETHYLENE GLYCOL, WITH IMPROVED CATALYST SYSTEM

(71) Applicant: Eastman Chemical Company, Kingsport, TN (US)

(72) Inventors: Emmett Dudley Crawford, Kingsport, TN (US); James Thomas Goetz, Kingsport, TN (US); Michael Keith Coggins, Jonesborough, TN (US); Douglas Weldon Carico, Jr., Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 1 day.

(21) Appl. No.: 16/326,297

(22) PCT Filed: Aug. 17, 2017

(86) PCT No.: PCT/US2017/047364
§ 371 (c)(1),
(2) Date: Feb. 18, 2019

(87) PCT Pub. No.: WO2018/035335
PCT Pub. Date: Feb. 22, 2018

(65) Prior Publication Data
US 2019/0211147 A1    Jul. 11, 2019

Related U.S. Application Data

(60) Provisional application No. 62/376,473, filed on Aug. 18, 2016, provisional application No. 62/520,214, filed on Jun. 15, 2017, provisional application No. 62/546,189, filed on Aug. 16, 2017.

(51) Int. Cl.
| | |
|---|---|
| *C08G 63/183* | (2006.01) |
| *C08G 63/199* | (2006.01) |
| *C08G 63/85* | (2006.01) |
| *C08K 5/00* | (2006.01) |
| *C08K 5/521* | (2006.01) |

(52) U.S. Cl.
CPC ......... *C08G 63/183* (2013.01); *C08G 63/199* (2013.01); *C08G 63/85* (2013.01); *C08K 5/005* (2013.01); *C08K 5/521* (2013.01)

(58) Field of Classification Search
CPC ... C08G 63/199; C08G 63/6856; C08L 67/02; C08J 2367/02
See application file for complete search history.

(56) References Cited

U.S. PATENT DOCUMENTS

| | | |
|---|---|---|
| 2,720,507 A | 10/1955 | Caldwell |
| 3,249,652 A | 5/1966 | Quisenberry |
| 3,313,777 A | 4/1967 | Elam et al. |
| 3,426,754 A | 2/1969 | Bierenbaum et al. |
| 3,772,405 A | 11/1973 | Hamb |
| 3,907,754 A | 9/1975 | Tershansy et al. |
| 3,944,699 A | 3/1976 | Mathews et al. |
| 4,138,459 A | 2/1979 | Brazinsky et al. |
| 4,263,425 A | 4/1981 | Rothe et al. |
| 4,582,752 A | 4/1986 | Duncan |
| 4,632,869 A | 12/1986 | Park et al. |
| 4,745,174 A | 5/1988 | Pruett et al. |
| 4,770,931 A | 9/1988 | Pollock et al. |
| 5,017,680 A | 5/1991 | Sublett |
| 5,106,944 A | 4/1992 | Sublett |
| 5,176,954 A | 1/1993 | Keller et al. |
| 5,372,864 A | 12/1994 | Weaver et al. |
| 5,384,377 A | 1/1995 | Weaver et al. |
| 5,435,955 A | 7/1995 | Kamei et al. |
| 5,654,347 A | 8/1997 | Khemani et al. |
| 5,688,899 A * | 11/1997 | Strand ............... C08G 63/6856 528/275 |

(Continued)

FOREIGN PATENT DOCUMENTS

| | | |
|---|---|---|
| CA | 740050 A | 8/1966 |
| EP | 0 214 859 A2 | 3/1987 |

(Continued)

OTHER PUBLICATIONS

ASTM D256; "Standard Test Methods for Determining the Izod Pendulum Impact Resistance of Plastics"; Published Nov. 2018.

(Continued)

*Primary Examiner* — Gregory Listvoyb
(74) *Attorney, Agent, or Firm* — Robert C. Morriss

(57) ABSTRACT

Described as one aspect of the invention are polyester compositions including at least one polyester which comprises:
(a) a dicarboxylic acid component comprising about 90 to about 100 mole % of terephthalic acid residues; and
(b) a glycol component comprising:
(i) about 10 to about 27 mole % 2,2,4,4-tetramethyl-1,3-cyclobutanediol residues; and
(ii) about 73 to about 90 mole % ethylene glycol residues;
wherein the total mole % of the dicarboxylic acid component is 100 mole %, and
wherein the total mole % of the glycol component is 100 mole %;
wherein the inherent viscosity of the polyester is from 0.50 to 0.8 dL/g; and
wherein the L* color values for the polyester is 90 or greater. The polyesters may be manufactured into articles.

15 Claims, 7 Drawing Sheets

(56) References Cited

U.S. PATENT DOCUMENTS

| | | | |
|---|---|---|---|
| 5,696,176 A | 12/1997 | Khemani et al. | |
| 5,705,575 A | 1/1998 | Kelsey | |
| 5,843,578 A | 12/1998 | Sasaki et al. | |
| 5,955,565 A | 9/1999 | Morris et al. | |
| 5,989,663 A | 11/1999 | Morris et al. | |
| 5,998,005 A | 12/1999 | Kanno | |
| 6,004,664 A | 12/1999 | Sasaki et al. | |
| 6,068,910 A | 5/2000 | Flynn et al. | |
| 6,096,854 A * | 8/2000 | Morris | C08G 63/199 528/271 |
| 6,187,898 B1 | 2/2001 | Wagner et al. | |
| 6,287,680 B1 | 9/2001 | Sasaki et al. | |
| 6,500,533 B1 | 12/2002 | Kong et al. | |
| 6,500,915 B1 | 12/2002 | Fujimori et al. | |
| 6,551,688 B2 | 4/2003 | Moskala et al. | |
| 6,559,272 B1 | 5/2003 | Jeon et al. | |
| 6,632,390 B1 | 10/2003 | Shelby et al. | |
| 6,649,731 B2 | 11/2003 | Hori et al. | |
| 6,667,383 B2 | 12/2003 | Fujimori et al. | |
| 6,720,085 B2 | 4/2004 | Ito et al. | |
| 6,777,099 B2 | 8/2004 | Tano et al. | |
| 6,998,463 B2 | 2/2006 | Fujimori et al. | |
| 7,030,181 B2 | 4/2006 | Moskala et al. | |
| 7,084,234 B2 | 7/2006 | Wilhelm et al. | |
| 7,235,623 B2 | 6/2007 | Strand et al. | |
| 7,300,999 B2 | 11/2007 | Deiss et al. | |
| 7,332,564 B2 | 2/2008 | Fujimori et al. | |
| RE40,571 E | 11/2008 | Ohmatsuzawa et al. | |
| 7,772,362 B2 | 8/2010 | Beall et al. | |
| 7,834,128 B2 | 11/2010 | Fujimori et al. | |
| 9,315,653 B2 | 4/2016 | Takegami | |
| 2001/0036545 A1 | 11/2001 | Nishi et al. | |
| 2003/0068453 A1 | 4/2003 | Kong | |
| 2003/0165671 A1 | 9/2003 | Hashimoto et al. | |
| 2003/0170427 A1 | 9/2003 | Ito et al. | |
| 2005/0096453 A1 | 5/2005 | Flynn et al. | |
| 2005/0113556 A1 | 5/2005 | Strand et al. | |
| 2006/0094858 A1 | 5/2006 | Turner et al. | |
| 2006/0121219 A1 | 6/2006 | Shelby et al. | |
| 2007/0142511 A1 | 6/2007 | Crawford | |
| 2007/0142615 A1 | 6/2007 | Crawford | |
| 2013/0059957 A1 * | 3/2013 | Germroth | C08L 67/02 524/141 |
| 2014/0162042 A1 | 6/2014 | Shih et al. | |
| 2014/0221599 A1 | 8/2014 | Hishimoto et al. | |
| 2019/0211145 A1 | 7/2019 | Strand et al. | |
| 2019/0211146 A1 | 7/2019 | Williams et al. | |

FOREIGN PATENT DOCUMENTS

| | | |
|---|---|---|
| EP | 0 581 970 B1 | 8/1998 |
| JP | S5523136 A | 2/1980 |
| JP | 61 037827 A | 2/1986 |
| JP | 63 193822 A | 8/1988 |
| JP | 11 158358 A | 6/1999 |
| JP | 2002 053740 A | 2/2002 |
| JP | 2002 121362 A | 4/2002 |
| JP | 2003 128894 | 5/2003 |
| JP | 3423062 B2 | 7/2003 |
| JP | 2004 181863 A | 7/2004 |
| JP | 3582887 B2 | 8/2004 |
| WO | WO 99 47605 A1 | 9/1999 |
| WO | WO 2002 28967 A1 | 4/2002 |
| WO | WO 2008 051320 A1 | 5/2008 |
| WO | WO 2008 051321 A1 | 5/2008 |

OTHER PUBLICATIONS

ASTM D790; "Standard Test Methods for Flexural Properties of Unreinforced and Reinforced Plastics and Electrical Insulating Materials"; Published Jul. 2017.

ASTM D882; "Standard Test Method for Tensile Properties of Thin Plastic Sheeting"; Published Aug. 2018.

ASTM D4440; "Standard Test Method for Plastics: Dynamic Mechanical Properties Melt Rheology"; Published Feb. 2015.

ASTM D6290; "Standard Test Method for Color Determination of Plastic Pellets"; Published Oct. 2018.

ASTM E308; "Standard Practice for Computing the Colors of Objects by Using the CIE System"; Published Sep. 2018.

Bullard, Ralph H., et al.; "Methylphenyl-Stannanes"; Journal of the American Chemical Society, 49(5), 1927, pp. 1369-1373.

Butschli, Jim; "Gauging demand for calendered plastics"; Packaging World, May 31, 1997; retrieved from https://www.packworld.com/article/machinery/fillingsealing/dry-filling/guaging-demand-calendered-plastics on Jun. 18, 2018; 4 pages.

Chambers, Robert F., et al.; "Phenyltin Compounds"; Journal of American Chemical Society, 48(4), 1926, pp. 1054-1062HA.

Clariant International Ltd, "An extensive range of wax additives for engineering resins"/ Waxes Overview Publication No. DA 8240 E; May 2013.

Clariant International Ltd, "Licowax OP Flakes, Partly saponified, ester wax"; Product Data Sheet, edition date Sep. 11, 2015, edition No. 8.

Clariant International Ltd, "Licowax S Flakes, acid wax"; Product Data Sheet, edition date May 7, 2015, edition No. 7.

Dealy, John M. and Kim, Seungoh; "Chapter 7 Gross Melt Fracture in Extrusion"; Polymer Processing Instabilities, Control and Understanding; 2005 pp. 207-236 editors:Hatzikiriakos, Savvas G. and Migler, Kalman B.

Fox, T. G.; "J5. Influence of Diluent and of Copolymer Composition on the Glass Temperature of a Polymer System"; Bull. Am. Phys. Soc., 1, 123 (1956).

Kelsey, Donald R., et al.; "High Impact, Amorphous Terephthalate Copolyesters of Rigid 2,2,4,4-Tetramethyl-1,3-cyclobutanediol with Flexible Diols"; Macromolecules, 33; 2000; pp. 5810-5818.

Kocheshkov, K.A.; "Untersuchungen über metallorganische Verbindungen, I. Mitteilung: Eine neue Klasse von Arylzinnverbindungen: Phenyl-trihalogen-stannane"; Berichte der deutschen chemischen Gesellschaft (A and B Series); Issue 4, vol. 62; pp. 996-999 (1929)—Original Language.

Krause, Charles A. and Greer, Willard N.; "The Dimethyltin Group and Some of its Reactions"; Journal of the American Chemical Society, 47(10), 1925, pp. 2568-2575.

Krause, Erich and Grosse, A. V.; "Die Chemie Der Metall—Organischen Verbindungen"; Recent Books; 1937, p. 148; 1937, Gobroder-Borntrager.

Meerwein, Hans and Bersin, Theodor; "Investigation of Metal Alcoholates and Orth acid Esters. I. Alkoxo Acids and Their Salts"; Annalen der Chemie, vol. 476; pp. 113-150; Sep. 20, 1929.

Tadmor, Zehev and Gogos, Costas G.; "Chapter 15.1 the Calendering Process"; Principles of Polymers Processing, Second Edition; pp. 865-866; 2006.

Titow, W. V.; "Calendering of PVC, Chapter 18"; PVC Technology, 4th Edition, pp. 803-848 (1984), Elsevier Publishing Co.

Co-pending U.S. Appl. No. 16/326,292, filed Feb. 18, 2019; Emmett Dudley Crawford.

Co-pending U.S. Appl. No. 16/326,283, filed Feb. 18, 2019; Marc Alan Strand.

Co-pending U.S. Appl. No. 16/326,287, filed Feb. 18, 2019; James Carl Williams.

Notification of Transmittal of the International Search Report and the Written Opinion of the International Searching Authority, or the Declaration dated Nov. 7, 2017 received in International Application No. PCT/US2017/047364.

Notification of Transmittal of the International Search Report and the Written Opinion of the International Searching Authority, or the Declaration dated Nov. 7, 2017 received in International Application No. PCT/US2017/047367.

Invitation to Pay Additional Fees and, Where Applicable, Protest Fee dated Nov. 2, 2017 received in International Application No. PCT/US2017/047374.

Notification of Transmittal of the International Search Report and the Written Opinion of the International Searching Authority, or the Declaration dated Feb. 6, 2018 received in International Application No. PCT/US2017/047374.

(56) References Cited

OTHER PUBLICATIONS

Notification of Transmittal of the International Search Report and the Written Opinion of the International Searching Authority, or the Declaration dated Nov. 3, 2017 received in International Application No. PCT/US2017/047382.
USPTO Office Action dated May 27, 2020 received in co-pending U.S. Appl. No. 16/326,292.
USPTO Office Action dated Nov. 5, 2020 received in co-pending U.S. Appl. No. 16/326,283.
USPTO Office Action dated Nov. 4, 2020 received in co-pending U.S. Appl. No. 16/326,292.

* cited by examiner

POLYESTER COMPOSITIONS WHICH COMPRISE TETRAMETHYL CYCLOBUTANEDIOL AND ETHYLENE GLYCOL, WITH IMPROVED CATALYST SYSTEM

This application is the national stage filing under 35 U.S.C. § 371 of PCT/US2017/047364, filed Aug. 17, 2017, which claims priority to U.S. Provisional Application No. 62/376,473, filed Aug. 18, 2016, and to U.S. Provisional Application No. 62/520,214, filed Jun. 15, 2017, and to U.S. Provisional Application No. 62/546,189, filed Aug. 16, 2017, the contents of which are incorporated herein by reference in their entirety.

FIELD OF THE INVENTION

The present invention relates to polyester compositions made from terephthalic acid, 2,2,4,4-tetramethyl-1,3-cyclobutanediol (TMCD) and ethylene glycol (EG), and having good TMCD incorporation, good color, and a desired inherent viscosity (IV) over a broad compositional range. The polyester compositions can be catalyzed by a catalyst system that contains titanium, and is stabilized by phosphorous compounds, resulting in good TMCD incorporation, improved color, and reactivity to achieve desired IV over the compositional range.

BACKGROUND OF THE INVENTION

Tin (Sn) based catalysts are typically the most efficient at incorporating TMCD into a polyester (Caldwell et al. CA 740050, and Kelsey et al., *Macromolecules* 2000, 33, 581). However, tin based catalysts typically produce a yellow to amber colored copolyester in the presence of EG (Kelsey, U.S. Pat. No. 5,705,575, see example 2; Morris et al., U.S. Pat. No. 5,955,565 see examples call polymer "amber").

Titanium (Ti) based catalysts are reported to be ineffective at incorporating 2,2,4,4-tetramethyl-1,3-cyclobutanediol (TMCD) into a polyester (Caldwell et al. CA 740050, Kelsey et al., Macromolecules 2000, 33, 5810).

While Sn based catalysts with phosphorus can achieve good TMCD incorporation, the materials are typically more colored and are more sluggish to build IV at the same preparation conditions.

US Patent Application No. 2007/0142511 discloses that polyesters with a glycol component comprising TMCD and EG, and optionally CHDM, can be prepared with titanium based catalysts. It indicates that TMCD incorporation can be further improved by use of tin based catalysts in addition to titanium based catalysts. It further indicates that the color of these copolyesters can be improved with the addition of certain levels of phosphorus containing compounds. This publication discloses a wide compositional range with a glycol component comprising: (i) about 1 to about 90 mole % TMCD residues; and (ii) about 99 to about 10 mole % EG residues. However, whenever relatively high levels of EG were present, e.g., polymers with only TMCD and EG, the catalyst system required a significant amount of Sn.

There is a commercial need for a polymeric material with a combination of properties making it ideal for injection molding, blow molding, extrusion, and thermoformed film and sheet applications including a combination of two or more of certain notched Izod impact strength, certain inherent viscosities, certain glass transition temperature (Tg), certain flexural modulus, good clarity, and good color.

In addition, there is a commercial need for a polymeric material with a combination of properties making it desirable for injection molding, blow molding, extrusion, and thermoformed film and sheet applications including a combination of three or more of certain notched Izod impact strength, certain glass transition temperature ($T_g$), certain flexural modulus, good clarity, and good color.

SUMMARY OF THE INVENTION

It has been found that significant amounts of TMCD can be incorporated into a polymer when DMT, EG and TMCD are catalyzed with a titanium catalyst, and in the absence of tin catalyst. It has further been found that for polymer compositions comprising relatively high levels of EG, e.g., polymers where the diols are only TMCD and EG, in which the TMCD fraction of the diol residue is less than approximately 25 mol % TMCD, titanium catalysts alone are essentially as effective as tin catalysts. It has also been found that catalysts containing a combination of titanium and manganese (Mn) can provide good TMCD incorporation, as well as good color.

In embodiments of the invention, copolyesters containing TMCD and EG can be prepared using catalysts chosen from: Sn, Ti, Mn, Co, Sb, Ge or combinations thereof, in amounts that provide good TMCD incorporation, as well as good color. In certain embodiments, copolyesters containing TMCD and EG can be prepared using a combination of titanium, or optionally titanium and manganese, based catalysts, and phosphorus based compounds, and resulting in a copolyester with acceptable color, good TMCD incorporation, and reactivity to achieve the desired IV over an entire desired compositional range. In embodiments, the combination of titanium and phosphorus (or titanium, manganese and phosphorous) at certain levels results in a copolyester with improved color, good TMCD incorporation, and reactivity to achieve the desired IV over the entire compositional range that includes: (a) a dicarboxylic acid component comprising: (i) 90 to 100 mole % terephthalic acid residues; and (ii) about 0 to about 10 mole % of aromatic and/or aliphatic dicarboxylic acid residues having up to 20 carbon atoms; and (b) a glycol component comprising: (i) about 10 to about 27 mole % 2,2,4,4-tetramethyl-1,3-cyclobutanediol (TMCD) residues; and (ii) about 73 to about 90 mole % ethylene glycol residues.

In an embodiment, equivalent total molar quantities of catalyst and phosphorus, wherein the catalyst is a titanium catalyst, or optionally a combination of manganese and titanium catalyst, is far superior to tin and phosphorus systems with regard to TMCD incorporation, good color, and reactivity to achieve desired inherent viscosity (IV) over a compositional range of TMCD from about 10 to about 27 mole %, or about 15 to about 25 mole %, based on the glycol component.

In embodiments, the invention is directed to a thermoplastic polyester composition comprised of: a) a dicarboxylic acid component comprising: (i) 90 to 100 mole % terephthalic acid residues; and (ii) about 0 to about 10 mole % of aromatic and/or aliphatic dicarboxylic acid residues having up to 20 carbon atoms; and (b) a glycol component comprising: (i) about 10 to about 27 mole % 2,2,4,4-tetramethyl-1,3-cyclobutanediol (TMCD) residues; and (ii) about 90 to about 73 mole % ethylene glycol residues; and wherein the total mole % of the dicarboxylic acid component is 100 mole %, and wherein the total mole % of the glycol component is 100 mole %; and wherein the inherent viscosity (IV) of the polyester is from 0.50 to 0.8 dL/g as determined in 60/40 (wt/wt) phenol/tetrachloroethane at a concentration of 0.25 g/50 ml at 25° C.; and wherein the L* color values for the polyester is 90 or greater, as determined by the L*a*b* color system measured following ASTM D 6290-98 and ASTM E308-99, performed on polymer granules ground to pass a 1 mm sieve. In embodiments, the L* color values for the polyester is greater than 90, as determined by the L*a*b* color system measured following ASTM D 6290-98 and ASTM E308-99, performed on polymer granules ground to pass a 1 mm sieve.

In certain embodiments, the glycol component comprises: (i) about 15 to about 25 mole % 2,2,4,4-tetramethyl-1,3-cyclobutanediol (TMCD) residues; and (ii) about 85 to about 75 mole % ethylene glycol residues; or (i) about 20 to about 25 mole % 2,2,4,4-tetramethyl-1,3-cyclobutanediol (TMCD) residues; and (ii) about 80 to about 75 mole % ethylene glycol residues; or (i) about 21 to about 24 mole % 2,2,4,4-tetramethyl-1,3-cyclobutanediol (TMCD) residues; and (ii) about 86 to about 79 mole % ethylene glycol residues.

In certain embodiments, the polyester composition further comprises: (c) a catalyst/stabilizer component comprising: (i) titanium atoms in the range of 10-50 ppm based on polymer weight, (ii) optionally, manganese atoms in the range of 10-100 ppm based on polymer weight, and (iii) phosphorus atoms in the range of 10-200 ppm based on polymer weight. In certain embodiments, the catalyst/stabilizer component comprises: (i) titanium atoms in the range of 10-50 ppm based on polymer weight, (ii) manganese atoms in the range of 10-100 ppm based on polymer weight, and (iii) phosphorus atoms in the range of 10-200 ppm based on polymer weight. In certain embodiments, the catalyst/stabilizer component comprises no intentionally added tin, where tin may only be present as an impurity. In certain embodiments, the catalyst/stabilizer component comprises no tin, or, if present, less than 5 ppm tin, or less than 2 ppm tin, or less than 1 ppm tin. The catalyst/stabilizer component can result in a good combination of TMCD incorporation, reactivity to achieve a desired target IV, increased brightness and reduced yellowness that cannot be achieved when using significant amounts of tin catalyst.

In certain embodiments, the invention relates to a catalyst/stabilizer/copolyester composition resulting in copolyesters containing ethylene glycol (EG), 2,2,4,4-tetramethyl-1,3-cyclobutanediol (TMCD), and, optionally, a small amount of 1,4-cyclohexanedimethanol (CHDM), e.g., less than 5 mole %, or less than 3 mole %, or less than 2 mole %, or less than 1 mole % CHDM, with good TMCD incorporation, reduced yellowness, and inherent viscosities in the range from 0.5 dL/g to 0.8 dL/g. In an embodiment, the catalyst/stabilizer system is useful for all compositions with a glycol component comprising: (i) about 10 to about 27 mole % TMCD residues; and (ii) about 90 to about 73 mole % EG residues. In embodiments, there is no intentionally added CHDM.

It is believed that certain polyester compositions formed from terephthalic acid, an ester thereof, and/or mixtures thereof, ethylene glycol, and 2,2,4,4-tetramethyl-1,3-cyclobutanediol, comprising certain catalysts and thermal stabilizers, reaction products thereof, and mixtures thereof, are superior to certain commercial polymers with respect to one or more of certain Notched Izod impact strength, certain inherent viscosities, certain glass transition temperature (Tg), certain flexural modulus, good clarity, good color, good dish washer durability, and good/improved ultrasonic welding ability.

In other embodiments of the invention, there is a commercial need for a polymeric material with a combination of properties making it desirable for certain applications, for example, injection molding, blow molding, extrusion, and thermoformed film and sheet applications, including a combination of two or more of the following properties: certain notched Izod impact strength, certain inherent viscosities, certain glass transition temperature (Tg), certain flexural modulus, good clarity, and good color.

In one aspect, the processes of making the polyesters useful in the invention can comprise a batch or continuous process.

In one aspect, the processes of making the polyesters useful in the invention comprise a continuous process.

In one aspect, the invention relates to a polyester composition comprising at least one polyester which comprises:
  (a) a dicarboxylic acid component comprising:
    (i) about 90 to about 100 mole % of terephthalic acid residues;
    (ii) about 0 to about 10 mole % of aromatic and/or aliphatic dicarboxylic acid residues having up to 20 carbon atoms; and
  (b) a glycol component comprising:
    (i) about 10 to about 27 mole % 2,2,4,4-tetramethyl-1,3-cyclobutanediol residues; and
    (ii) about 73 to about 90 mole % ethylene glycol residues, and
    (iii) less than about 5 mole %, or less than 2 mole %, of any other modifying glycols;
  wherein the total mole % of the dicarboxylic acid component is 100 mole %, and
  wherein the total mole % of the glycol component is 100 mole %; and
  wherein the inherent viscosity of the polyester is from 0.50 to 0.8 dL/g as determined in 60/40 (wt/wt) phenol/tetrachloroethane at a concentration of 0.25 g/50 ml at 25° C.

In one aspect, this invention relates to a polyester composition comprising at least one polyester which comprises:
  (a) a dicarboxylic acid component comprising:
    (i) about 90 to about 100 mole % of terephthalic acid residues;
    (ii) about 0 to about 10 mole % of aromatic and/or aliphatic dicarboxylic acid residues having up to 20 carbon atoms; and
  (b) a glycol component comprising:
    (i) about 10 to about 27 mole % 2,2,4,4-tetramethyl-1,3-cyclobutanediol residues; and
    (ii) about 73 to about 90 mole % ethylene glycol residues;
  wherein the total mole % of the dicarboxylic acid component is 100 mole %; and
  wherein the total mole % of the glycol component is 100 mole %;
  wherein the inherent viscosity of the polyester is from 0.50 to 0.80 dL/g as determined in 60/40 (wt/wt) phenol/tetrachloroethane at a concentration of 0.25 g/50 ml at 25° C.; and
  optionally, wherein at least one branching agent is added before and/or during polymerization of the polyester.

In one aspect, the invention relates to a polyester composition comprising at least one polyester which comprises:
  (a) a dicarboxylic acid component comprising:
    (i) about 90 to about 100 mole % of terephthalic acid residues;
    (ii) about 0 to about 10 mole % of aromatic and/or aliphatic dicarboxylic acid residues having up to 20 carbon atoms; and (b) a glycol component comprising:
  (i) about 10 to about 27 mole % 2,2,4,4-tetramethyl-1,3-cyclobutanediol residues; and
  (ii) about 73 to about 90 mole % ethylene glycol residues;
wherein the total mole % of the dicarboxylic acid component is 100 mole %, and
wherein the total mole % of the glycol component is 100 mole %;
wherein the inherent viscosity of the polyester is from 0.50 to 0.80 dL/g as determined in 60/40 (wt/wt) phenol/tetrachloroethane at a concentration of 0.25 g/50 ml at 25° C.; and wherein the polyester has at least one of the following properties chosen from: a $T_g$ of from about 90 to about 108° C. as measured by a TA 2100 Thermal Analyst Instrument at a scan rate of 20° C./min, a flexural modulus at 23° C. of greater than about 2000 MPa (290,000 psi) as defined by ASTM D790, and a notched Izod impact strength greater than about 25 J/m (0.47 ft-lb/in) according to ASTM D256 with a 10-mil notch using a ⅛-inch thick bar at 23° C. In one embodiment, the L* color values for the polyester composition is 90 or greater, or greater than 90, as determined by the L*a*b* color system measured following ASTM D 6290-98 and ASTM E308-99, performed on polymer granules ground to pass a 1 mm sieve.

In one aspect, this invention relates to a polyester composition comprising:
(I) at least one polyester which comprises which comprises:
  (a) a dicarboxylic acid component comprising:
    (i) about 90 to about 100 mole % of terephthalic acid residues;
    (ii) about 0 to about 10 mole % of aromatic and/or aliphatic dicarboxylic acid residues having up to 20 carbon atoms; and
  (b) a glycol component comprising:
    (i) about 10 to about 27 mole % 2,2,4,4-tetramethyl-1,3-cyclobutanediol residues; and
    (ii) about 73 to about 90 mole % ethylene glycol residues;
wherein the total mole % of the dicarboxylic acid component is 100 mole %, wherein the total mole % of the glycol component is 100 mole %;
wherein the inherent viscosity of the polyester is from 0.50 to 0.80 dL/g as determined in 60/40 (wt/wt) phenol/tetrachloroethane at a concentration of 0.25 g/50 ml at 25° C.; wherein the L* color values for the polyester is 90 or greater, or greater than 90, as determined by the L*a*b* color system measured following ASTM D 6290-98 and ASTM E308-99, performed on polymer granules ground to pass a 1 mm sieve; and wherein the polyester has at least one of the following properties chosen from: a $T_g$ of from about 90 to about 108° C. as measured by a TA 2100 Thermal Analyst Instrument at a scan rate of 20° C./min, a flexural modulus at 23° C. of greater than 2000 MPa (290,000 psi) as defined by ASTM D790, and a notched Izod impact strength greater than 25 J/m (0.47 ft-lb/in) according to ASTM D256 with a 10-mil notch using a ⅛-inch thick bar at 23° C. In one embodiment, the polyester composition further comprises: (II) a catalyst/stabilizer component comprising: (i) titanium atoms in the range of 10-50 ppm based on polymer weight, (ii) optionally, manganese atoms in the range of 10-100 ppm based on polymer weight, and (iii) phosphorus atoms in the range of 10-200 ppm based on polymer weight. In one embodiment, the 2,2,4,4-tetramethyl-1,3-cyclobutanediol residues is a mixture comprising more than 50 mole % of cis-2,2,4,4-tetramethyl-1,3-cyclobutanediol residues and less than 50 mole % of trans-2,2,4,4-tetramethyl-1,3-cyclobutanediol residues.

In one aspect, the invention relates to a process for making a polyester comprising the following steps:
(I) heating a mixture at at least one temperature chosen from 150° C. to 250° C., under at least one pressure chosen from the range of 0 psig to 75 psig wherein said mixture comprises:
  (a) a dicarboxylic acid component comprising:
    (i) about 90 to about 100 mole % of terephthalic acid residues;
    (ii) about 0 to about 10 mole % of aromatic and/or aliphatic dicarboxylic acid residues having up to 20 carbon atoms; and
  (b) a glycol component comprising:
    (i) about 10 to about 27 mole % 2,2,4,4-tetramethyl-1,3-cyclobutanediol residues; and
    (ii) about 73 to about 90 mole % ethylene glycol residues;
wherein the molar ratio of glycol component/dicarboxylic acid component added in Step (I) is 1.01-3.0/1.0 and wherein TMCD is added in an amount from about 10 to 54 mole %, to allow for about 50 to 100% conversion of TMCD in the reaction and to arrive at a final polymer having about 10 to 27 mole % 2,2,4,4-tetramethyl-1,3-cyclobutanediol residues;
wherein the mixture in Step (I) is heated in the presence of:
  (i) at least one catalyst chosen from Sn, Ti, Mn, Co, Sb, Ge or combinations thereof; and (ii) at least one phosphorus compound;
(II) heating the product of Step (I) at a temperature of 230° C. to 320° C. for 1 to 6 hours, under at least one pressure chosen from the range of the final pressure of Step (I) to 0.02 torr absolute, to form a final polyester;
wherein the total mole % of the dicarboxylic acid component of the final polyester is 100 mole %; and wherein the total mole % of the glycol component of the final polyester is 100 mole %;
wherein the inherent viscosity of the polyester is from 0.50 to 0.80 dL/g as determined in 60/40 (wt/wt) phenol/tetrachloroethane at a concentration of 0.25 g/50 ml at 25° C.; and wherein the L* color values for the polyester is 90 or greater, or greater than 90, as determined by the L*a*b* color system measured following ASTM D 6290-98 and ASTM E308-99, performed on polymer granules ground to pass a 1 mm sieve. In certain embodiments, the catalyst comprises at least one titanium compound, and, optionally, at least one manganese compound. In certain embodiments, the catalyst comprises no tin, or, if present, less than 5 ppm tin, or less than 2 ppm tin, or less than 1 ppm tin based on the total weight of the resulting polymer. In one embodiment, the catalyst comprises no tin.

In one aspect, the invention relates to a process for making a polyester comprising the following steps:
(I) heating a mixture at at least one temperature chosen from 150° C. to 250° C., under at least one pressure chosen from the range of 0 psig to 75 psig wherein said mixture comprises:
  (a) a dicarboxylic acid component comprising:
    (i) about 90 to about 100 mole % of terephthalic acid residues;

(ii) about 0 to about 10 mole % of aromatic and/or aliphatic dicarboxylic acid residues having up to 20 carbon atoms; and (b) a glycol component comprising:
(i) about 10 to about 27 mole % 2,2,4,4-tetramethyl-1,3-cyclobutanediol residues; and
(ii) about 73 to about 90 mole % ethylene glycol residues;

wherein the molar ratio of glycol component/dicarboxylic acid component added in Step (I) is 1.01-3.0/1.0 and wherein TMCD is added in an amount from about 10 to 54 mole %, to allow for about 50 to 100% conversion of TMCD in the reaction and to arrive at a final polymer having about 10 to 27 mole % 2,2,4,4-tetramethyl-1,3-cyclobutanediol residues;

wherein the mixture in Step (I) is heated in the presence of:
(i) at least one catalyst comprising at least one titanium compound, and, optionally, at least one manganese compound; and (ii) at least one phosphorus compound;

(II) heating the product of Step (I) at a temperature of 230° C. to 320° C. for 1 to 6 hours, under at least one pressure chosen from the range of the final pressure of Step (I) to 0.02 torr absolute, to form a final polyester;

wherein the total mole % of the dicarboxylic acid component of the final polyester is 100 mole %; and wherein the total mole % of the glycol component of the final polyester is 100 mole %; and wherein the inherent viscosity of the polyester is from 0.50 to 0.80 dL/g as determined in 60/40 (wt/wt) phenol/tetrachloroethane at a concentration of 0.25 g/50 ml at 25° C.; and wherein the L* color values for the polyester is 90 or greater, or greater than 90, as determined by the L*a*b* color system measured following ASTME 6290-98 and ASTM E308-99, performed on polymer granules ground to pass a mm sieve. In one embodiment, the 2,2,4,4-tetramethyl-1,3-cyclobutanediol residues is a mixture comprising more than 50 mole % of cis-2,2,4,4-tetramethyl-1,3-cyclobutanediol residues and less than 50 mole % of trans-2,2,4,4-tetramethyl-1,3-cyclobutanediol residues.

In one aspect, for the polyester(s) useful in the invention and for the processes useful in the invention, the b* values for the polyesters useful in the invention [in one embodiment, in the presence of toner(s), and, in one embodiment in the absence of toner(s)] can be from −12 to less than 10 as determined by the L*a*b* color system of the CIE (International Commission on Illumination) (translated), wherein L* represents the lightness coordinate, a* represents the red/green coordinate, and b* represents the yellow/blue coordinate. In one embodiment, the b* values for the polyesters useful in the invention [in one embodiment, in the presence of and/or in the absence of toner(s)] can be from 0 to 10. In one embodiment, the b* values for the polyesters useful in the invention [in one embodiment, in the presence of and/or in the absence of toner(s)] can be from 0 to 5.

In one aspect, the invention includes injection molded parts which can comprise any of the polyester compositions of the invention.

In one aspect, the polyesters useful in the invention can comprise at least one phosphate ester whether or not present as a thermal stabilizer.

In one aspect, the polyesters useful in the invention can comprise at least one phosphate ester described herein which is present as a thermal stabilizer.

In one aspect, the polyesters useful in the invention contain no branching agent, or alternatively, at least one branching agent is added either prior to or during polymerization of the polyester.

In one aspect, the polyesters useful in the invention contain at least one branching agent without regard to the method or sequence in which it is added.

In one aspect, certain polyesters useful in the invention may be amorphous or semicrystalline. In one aspect, certain polyesters useful in the invention can have a relatively low crystallinity. Certain polyesters useful in the invention can thus have a substantially amorphous morphology, meaning that the polyesters comprise substantially unordered regions of polymer.

In one aspect, the polyesters, polyester compositions and/or processes of the invention can comprise phosphorus atoms and titanium atoms. In one embodiment, the polyesters, polyester compositions and/or processes of the invention can further comprise manganese atoms. In embodiments of the invention, the polyesters, polyester compositions and/or processes of the invention do not contain tin atoms.

In one aspect, any of the polyester(s), polyester compositions and/or processes of the invention can comprise at least one titanium compound, and at least one phosphorous compound, and, optionally, at least one manganese compound.

In one aspect, at least one phosphorus compound useful in the invention comprise phosphoric acid, phosphorous acid, phosphonic acid, phosphinic acid, phosphonous acid, and various esters and salts thereof. The esters can be alkyl, branched alkyl, substituted alkyl, difunctional alkyl, alkyl ethers, aryl, and substituted aryl.

In one aspect, at least one phosphorus compound useful in the invention comprise at least one phosphorus compound chosen from at least one of substituted or unsubstituted alkyl phosphate esters, substituted or unsubstituted aryl phosphate esters, substituted or unsubstituted mixed alkyl aryl phosphate esters, diphosphites, salts of phosphoric acid, phosphine oxides, and mixed alkyl aryl phosphites, reaction products thereof, and mixtures thereof. The phosphate esters include esters in which the phosphoric acid is fully esterified or only partially esterified.

In one aspect, at least one phosphorus compound useful in the invention comprise at least one phoshorus compound chosen from at least one of substituted or unsubstituted alkyl phosphate esters, substituted or unsubstituted aryl phosphate esters, mixed substituted or unsubstituted alkyl aryl phosphate esters, reaction products thereof, and mixtures thereof. The phosphate esters include esters in which the phosphoric acid is fully esterified or only partially esterified.

In one aspect, at least one phosphorus compound useful in the invention are chosen from at least one of alkyl phosphate esters, aryl phosphate esters, mixed alkyl aryl phosphate esters, reaction products, thereof, and mixtures thereof.

In one aspect, at least one phosphorus compound useful in the invention may comprise at least one aryl phosphate ester.

In one aspect, at least one phosphorus compound useful in the invention may comprise at least one unsubstituted aryl phosphate ester.

In one aspect, at least one phosphorus compound useful in the invention may comprise at least one aryl phosphate ester which is not substituted with benzyl groups.

In one aspect, at least one phosphorus compound useful in the invention may comprise at least one triaryl phosphate ester.

In one aspect, at least one phosphorus compound useful in the invention may comprise at least one triaryl phosphate ester which is not substituted with benzyl groups.

In one aspect, at least one phosphorus compound useful in the invention may comprise at least one alkyl phosphate ester.

In one aspect, at least one phosphorus compound useful in the invention may comprise triphenyl phosphate and/or Merpol A. In one embodiment, any of the polyester compositions of the invention may comprise triphenyl phosphate.

In one aspect, any of the processes described herein for making any of the polyester compositions and/or polyesters can comprise at least one mixed alkyl aryl phosphite, such as, for example, bis(2,4-dicumylphenyl)pentaerythritol diphosphite also known as Doverphos S-9228 (Dover Chemicals, CAS #154862-43-8).

In one aspect, any of the processes described herein for making any of the polyester compositions and/or polyesters can comprise at least one one phosphine oxide.

In one aspect, any of the processes described herein for making any of the polyester compositions and/or polyesters can comprise at least one salt of phosphoric acid such as, for example, $KH_2PO_4$ and $Zn_3(PO_4)_2$.

It is believed that any of the processes of making the polyesters useful in the invention may be used to make any of the polyesters useful in the invention.

In one aspect, the pressure used in Step (I) of any of the processes of the invention consists of at least one pressure chosen from 0 psig to 75 psig. In one embodiment, the pressure used in Step (I) of any of the processes of the invention consists of at least one pressure chosen from 0 psig to 50 psig.

In one aspect, the pressure used in Step (II) of any of the processes of the invention consists of at least one pressure chosen from 20 torr absolute to 0.02 torr absolute; in one embodiment, the pressure used in Step (II) of any of the processes of the invention consists of at least one pressure chosen from 10 torr absolute to 0.02 torr absolute; in one embodiment, the pressure used in Step (II) of any of the processes of the invention consists of at least one pressure chosen from 5 torr absolute to 0.02 torr absolute; in one embodiment, the pressure used in Step (II) of any of the processes of the invention consists of at least one pressure chosen from 3 torr absolute to 0.02 torr absolute; in one embodiment, the pressure used in Step (II) of any of the processes of the invention consists of at least one pressure chosen from 20 torr absolute to 0.1 torr absolute; in one embodiment, the pressure used in Step (II) of any of the processes of the invention consists of at least one pressure chosen from 10 torr absolute to 0.1 torr absolute; in one embodiment, the pressure used in Step (II) of any of the processes of the invention consists of at least one pressure chosen from 5 torr absolute to 0.1 torr absolute; in one embodiment, the pressure used in Step (II) of any of the processes of the invention consists of at least one pressure chosen from 3 torr absolute to 0.1 torr absolute.

In one aspect, the molar ratio of glycol component/dicarboxylic acid component added in Step (I) of any of the processes of the invention is 1.0-3.0/1.0; in one aspect, the molar ratio of glycol component/dicarboxylic acid component added in Step (I) of any of the processes of the invention is 1.0-2.5/1.0; in one aspect, the molar ratio of glycol component/dicarboxylic acid component added in Step (I) of any of the processes of the invention is 1.0-2.0/1.0; in one aspect, the molar ratio of glycol component/dicarboxylic acid component added in Step (I) of any of the processes of the invention is 1.0-1.75/1.0; in one aspect, the molar ratio of glycol component/dicarboxylic acid component added in Step (I) of any of the processes of the invention is 1.0-1.5/1.0.

In one aspect, the molar ratio of glycol component/dicarboxylic acid component added in Step (I) of any of the processes of the invention is 1.01-3.0/1.0; in one aspect, the molar ratio of glycol component/dicarboxylic acid component added in Step (I) of any of the processes of the invention is 1.01-2.5/1.0; in one aspect, the molar ratio of glycol component/dicarboxylic acid component added in Step (I) of any of the processes of the invention is 1.01-2.0/1.0; in one aspect, the molar ratio of glycol component/dicarboxylic acid component added in Step (I) of any of the processes of the invention is 1.01-1.75/1.0; in one aspect, the molar ratio of glycol component/dicarboxylic acid component added in Step (I) of any of the processes of the invention is 1.01-1.5/1.0.

In any of the process embodiments for making the polyesters useful in the invention, the heating time of Step (II) may be from 1 to 5 hours. In any of the process embodiments for making the polyesters useful in the invention, the heating time of Step (II) may be from 1 to 4 hours. In any of the process embodiments for making the polyesters useful in the invention, the heating time of Step (II) may be from 1 to 3 hours. In any of the process embodiments for making the polyesters useful in the invention, the heating time of Step (II) may be from 1.5 to 3 hours. In any of the process embodiments for making the polyesters useful in the invention, the heating time of Step (II) may be from 1 to 2 hours.

In one aspect, the addition of the phosphorus compound(s) in the process(es) of the invention can result in a weight ratio of total phosphorus atoms to total titanium atoms in the final polyester of 0.3-2.5:1. In one embodiment, the addition of the phosphorus compound(s) in the process(es) of the invention can result in a weight ratio of total phosphorus atoms to total titanium atoms in the final polyester of 0.3-2.0:1.

For example, the weight of titanium atoms and phosphorus atoms present in the final polyester can be measured in ppm and can result in a weight ratio of total phosphorus atoms to total titanium atoms in the final polyester of any of the aforesaid weight ratios.

In one aspect, the addition of the phosphorus compound(s) in the process(es) of the invention can result in a weight ratio of total phosphorus atoms to total manganese atoms in the final polyester of 0.3-2.5:1. In one embodiment, the addition of the phosphorus compound(s) in the process(es) of the invention can result in a weight ratio of total phosphorus atoms to total manganese atoms in the final polyester of 0.3-2.0:1.

For example, the weight of titanium atoms and phosphorus atoms present in the final polyester can be measured in ppm and can result in a weight ratio of total phosphorus atoms to total manganese atoms in the final polyester of any of the aforesaid weight ratios.

In one aspect, the amount of titanium atoms in the polyesters useful in the invention can be from 10 to 50 ppm titanium atoms based on the weight of the final polyester.

In one aspect, the amount of titanium atoms in the polyesters useful in the invention can be from 15 to 50 ppm titanium atoms based on the weight of the final polyester.

In one aspect, the amount of manganese atoms in the polyesters useful in the invention can be from 10 to 100 ppm manganese atoms based on the weight of the final polyester.

In one aspect, the amount of manganese atoms in the polyesters useful in the invention can be from 10 to 60 ppm manganese atoms based on the weight of the final polyester.

In one aspect, the amount of phosphorus atoms in the polyesters useful in the invention can be from 1 to 200 ppm phosphorus atoms based on the weight of the final polyester.

In one embodiment, the amount of phosphorus atoms in the polyesters useful in the invention can be from 15 to 60 ppm, or 15 to 55 ppm, phosphorus atoms based on the weight of the final polyester and the amount of titanium atoms in the polyester can be from 15 to 50 ppm titanium atoms based on the weight of the final polyester.

In one embodiment, the amount of phosphorus atoms in the polyesters useful in the invention can be from 15 to 55 ppm phosphorus atoms based on the weight of the final polyester, the amount of titanium atoms in the polyester can be from 15 to 50 ppm titanium atoms based on the weight of the final polyester, and the amount of manganese atoms in the polyester can be from 10 to 60 ppm titanium atoms based on the weight of the final polyester.

In one aspect, the polyester compositions are useful in shaped articles, including, but not limited to, extruded, and/or molded articles including, but not limited to, injection molded articles, extruded articles, cast extrusion articles, profile extrusion articles, melt spun articles, thermoformed articles, extrusion molded articles, injection blow molded articles, injection stretch blow molded articles, extrusion blow molded articles and extrusion stretch blow molded articles. These articles can include, but are not limited to, films, bottles, containers, drinkware, medical parts, sheet and/or fibers.

In one aspect, the polyester compositions useful in the invention may be used in various types of film and/or sheet, including but not limited to extruded film(s) and/or sheet(s), compression molded film(s) and/or sheet(s), solution casted film(s) and/or sheet(s). Methods of making film and/or sheet include but are not limited to extrusion, compression molding, and solution casting.

In one aspect, the invention is related to thermoformed film(s) and/or sheet(s) comprising the polyester(s) and/or polyester compositions of the invention.

In one aspect, the invention is related to articles of manufacture which incorporate the thermoformed film and/or sheet of the invention.

Also, in one aspect, a process of making thermoformed film and/or sheet is provided wherein the step of drying the films and/or sheets prior to thermoforming is eliminated.

In one aspect, the invention provides a process for preparing polyesters containing ethylene glycol and 2,2,4,4-tetramethyl-1,3-cyclobutanediol, with improved color and/or clarity. In embodiments of the invention, the polyester contains less than about 2 mole % of a modifying glycol having from 3 to 16 carbon atoms. In embodiments, the polyester contains less than about 2 mole % of any modifying glycols. In embodiments, the polyester contains no other added modifying glycols. It should be understood that some other glycol residues may be formed in situ during processing.

In one aspect, the polyesters useful in the invention can be amorphous or semicrystalline. In one aspect, certain polyesters useful in the invention can have a relatively low crystallinity. Certain polyesters useful in the invention can thus have a substantially amorphous morphology, meaning that the polyesters comprise substantially unordered regions of polymer.

BRIEF DESCRIPTION OF THE FIGURES

Embodiments of the present disclosure are described herein with reference to the following figures, wherein.

DETAILED DESCRIPTION OF THE INVENTION

Figure 1:
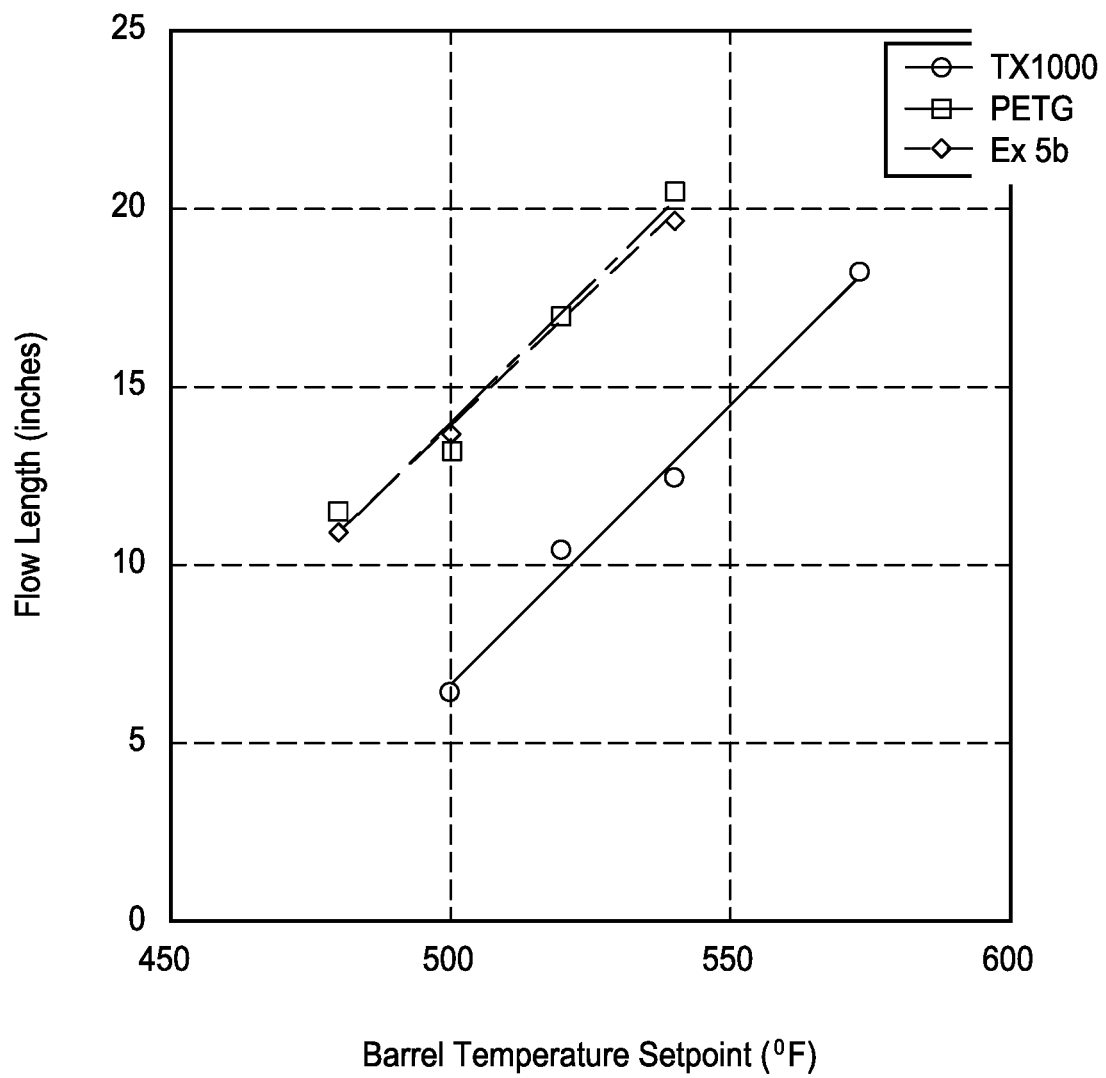
FIG. 1 is a graph depicting flow length as a function of barrel temperature for different polymer compositions in accordance with spiral flow testing in Example 11.

The present invention may be understood more readily by reference to the following detailed description of certain embodiments of the invention and the working examples. In accordance with the purpose(s) of this invention, certain embodiments of the invention are described in the Summary of the Invention and are further described herein below. Also, other embodiments of the invention are described herein.

It is believed that certain polyesters and/or polyester composition(s) of the invention formed from terephthalic acid, an ester thereof, and/or mixtures thereof, ethylene glycol and 2,2,4,4-tetramethyl-1,3-cyclobutanediol, and, further comprising certain catalysts and stabilizers, reaction products thereof, and mixtures thereof, can have a unique combination of two or more of the following properties: certain notched Izod impact strength, certain inherent viscosities, certain glass transition temperature (Tg), certain flexural modulus, good clarity, good color, good dish washer durability, and good/improved ultrasonic welding ability. In certain embodiments of the invention, certain polyesters and/or polyester compositions of the invention can have a unique combination of three or more of certain notched Izod impact strength, certain inherent viscosities, certain glass transition temperature (Tg), certain flexural modulus, good clarity, good color, good dish washer durability, and good/improved ultrasonic welding ability.

In one embodiment, copolyesters containing 2,2,4,4-tetramethyl-1,3-cyclobutanediol and ethylene glycol over a range of compositions can be prepared with a titanium catalyst or mixture of titanium and manganese catalysts.

It is believed that the color of these copolyesters can be improved with the addition during polymerization of certain levels of phosphorus containing compounds/stabilizers. The present invention relates to polyesters based on terephthalic acid, 2,2,4,4-tetramethyl-1,3-cyclobutanediol and ethylene glycol catalyzed by certain catalyst types and/or amounts that provide improved properties (as discussed herein), and in certain embodiments a titanium catalyst, or in certain other embodiments a combination of titanium and manganese catalysts, stabilized by phosphorous compounds resulting in good TMCD incorporation, improved color (higher brightness and/or less yellow), and reactivity to achieve desired inherent viscosity (IV) over the compositional range described herein.

When titanium is added to the polyesters and/or polyester compositions and/or process of making the polyesters of the invention, it is added to the process of making the polyester in the form of a titanium compound. The amount of the titanium compound added to the polyesters of the invention and/or polyester compositions of the invention and/or processes of the invention can be measured in the form of titanium atoms present in the final polyester, for example, by weight measured in ppm.

When manganese is added to the polyesters and/or polyester compositions and/or process of making the polyesters of the invention, it is added to the process of making the polyester in the form of a manganese compound. The amount of the manganese compound added to the polyesters of the invention and/or polyester compositions of the invention and/or processes of the invention can be measured in the form of manganese atoms present in the final polyester, for example, by weight measured in ppm.

When phosphorus is added to the polyesters and/or polyester compositions and/or process of making the polyesters of the invention, it is added to the process of making the polyester in the form of a phosphorus compound. In one embodiment, this phosphorus compound can comprise at least one phosphate ester(s). The amount of phosphorus compound, for example, phosphate ester(s), added to the polyesters of the invention and/or polyester compositions of the invention and/or processes of the invention can be measured in the form of phosphorus atoms present in the final polyester, for example, by weight measured in ppm.

The term "polyester", as used herein, is intended to include "copolyesters" and is understood to mean a synthetic polymer prepared by the reaction of one or more difunctional carboxylic acids and/or multifunctional carboxylic acids with one or more difunctional hydroxyl compounds and/or multifunctional hydroxyl compounds, for example, branching agents. Typically, the difunctional carboxylic acid can be a dicarboxylic acid and the difunctional hydroxyl compound can be a dihydric alcohol such as, for example, glycols and diols. The term "glycol" as used herein includes, but is not limited to, diols, glycols, and/or multifunctional hydroxyl compounds, for example, branching agents. Alternatively, the difunctional carboxylic acid may be a hydroxy carboxylic acid such as, for example, p-hydroxybenzoic acid, and the difunctional hydroxyl compound may be an aromatic nucleus bearing 2 hydroxyl substituents such as, for example, hydroquinone. The term "residue", as used herein, means any organic structure incorporated into a polymer through a polycondensation and/or an esterification reaction from the corresponding monomer. The term "repeating unit", as used herein, means an organic structure having a dicarboxylic acid residue and a diol residue bonded through a carbonyloxy group. Thus, for example, the dicarboxylic acid residues may be derived from a dicarboxylic acid monomer or its associated acid halides, esters, salts, anhydrides, and/or mixtures thereof. Furthermore, as used herein, the term "diacid" includes multifunctional acids, for example, branching agents. As used herein, therefore, the term "dicarboxylic acid" is intended to include dicarboxylic acids and any derivative of a dicarboxylic acid, including its associated acid halides, esters, half-esters, salts, half-salts, anhydrides, mixed anhydrides, and/or mixtures thereof, useful in a reaction process with a diol to make polyester. As used herein, the term "terephthalic acid" is intended to include terephthalic acid itself and residues thereof as well as any derivative of terephthalic acid, including its associated acid halides, esters, half-esters, salts, half-salts, anhydrides, mixed anhydrides, and/or mixtures thereof or residues thereof useful in a reaction process with a diol to make polyester.

The polyesters used in the present invention typically can be prepared from dicarboxylic acids and diols which react in substantially equal proportions and are incorporated into the polyester polymer as their corresponding residues. The polyesters of the present invention, therefore, can contain substantially equal molar proportions of acid residues (100 mole %) and diol (and/or multifunctional hydroxyl compound) residues (100 mole %) such that the total moles of repeating units is equal to 100 mole %. The mole percentages provided in the present disclosure, therefore, may be based on the total moles of acid residues, the total moles of diol residues, or the total moles of repeating units. For example, a polyester containing 10 mole % isophthalic acid, based on the total acid residues, means the polyester contains 10 mole % isophthalic acid residues out of a total of 100 mole % acid residues. Thus, there are 10 moles of isophthalic acid residues among every 100 moles of acid residues. In another example, a polyester containing 25 mole % 2,2,4,4-tetramethyl-1,3-cyclobutanediol, based on the total diol residues, means the polyester contains 25 mole % 2,2,4,4-tetramethyl-1,3-cyclobutanediol residues out of a total of 100 mole % diol residues. Thus, there are 25 moles of 2,2,4,4-tetramethyl-1,3-cyclobutanediol residues among every 100 moles of diol residues.

In other aspects of the invention, the glycol component for the polyesters useful in the invention include but are not limited to at least one of the following combinations of ranges: about 10 to about 30 mole % 2,2,4,4-tetramethyl-1,3-cyclobutanediol and about 90 to about 70 mole % ethylene glycol; about 10 to about 27 mole % 2,2,4,4-tetramethyl-1,3-cyclobutanediol and about 90 to about 73 mole % ethylene glycol; about 15 to about 26 mole % 2,2,4,4-tetramethyl-1,3-cyclobutanediol and about 85 to about 74 mole % ethylene glycol; about 18 to about 26 mole % 2,2,4,4-tetramethyl-1,3-cyclobutanediol and about 82 to about 77 mole % ethylene glycol; about 20 to about 25 mole % 2,2,4,4-tetramethyl-1,3-cyclobutanediol and about 80 to about 75 mole % ethylene glycol; about 21 to about 24 mole % 2,2,4,4-tetramethyl-1,3-cyclobutanediol and about 79 to about 76 mole % ethylene glycol; or about 22 to about 24 mole % 2,2,4,4-tetramethyl-1,3-cyclobutanediol and about 78 to about 76 mole % ethylene glycol.

For embodiments of the invention, the polyesters useful in the invention may exhibit at least one of the following inherent viscosities as determined in 60/40 (wt/wt) phenol/tetrachloroethane at a concentration of 0.25 g/50 ml at 25° C. from 0.50 to 0.8 dL/g; 0.55 to 0.75 dL/g; 0.57 to 0.73 dL/g; 0.58 to 0.72 dL/g; 0.59 to 0.71 dL/g; 0.60 to 0.70 dL/g; 0.61 to 0.69 dL/g; 0.62 to 0.68 dL/g; 0.63 to 0.67 dL/g; 0.64 to 0.66 dL/g; or about 0.65 dL/g.

In one embodiment, terephthalic acid may be used as the starting material. In another embodiment, dimethyl terephthalate may be used as the starting material. In yet another embodiment, mixtures of terephthalic acid and dimethyl terephthalate may be used as the starting material and/or as an intermediate material.

In certain embodiments, terephthalic acid or an ester thereof, such as, for example, dimethyl terephthalate or a mixture of terephthalic acid residues and an ester thereof can make up a portion or all of the dicarboxylic acid component used to form the polyesters useful in the invention. In certain embodiments, terephthalic acid residues can make up a portion or all of the dicarboxylic acid component used to form the polyesters useful in the invention. In certain embodiments, higher amounts of terephthalic acid can be used in order to produce a higher impact strength polyester. For purposes of this disclosure, the terms "terephthalic acid" and "dimethyl terephthalate" are used interchangeably herein. In one embodiment, dimethyl terephthalate is part or all of the dicarboxylic acid component used to make the polyesters useful in the present invention. In embodiments, ranges of from 70 to 100 mole %; or 80 to 100 mole %; or 90 to 100 mole %; or 99 to 100 mole %; or 100 mole % terephthalic acid and/or dimethyl terephthalate and/or mixtures thereof may be used.

In addition to terephthalic acid, the dicarboxylic acid component of the polyesters useful in the invention can comprise up to 10 mole %, up to 5 mole %, or up to 1 mole % of one or more modifying aromatic dicarboxylic acids. Yet another embodiment contains 0 mole % modifying aromatic dicarboxylic acids. Thus, if present, it is contemplated that the amount of one or more modifying aromatic dicarboxylic acids can range from any of these preceding endpoint values including, for example, 0.01 to 10 mole %, from 0.01 to 5 mole % and from 0.01 to 1 mole %. In one embodiment, modifying aromatic dicarboxylic acids that may be used in the present invention include but are not limited to those having up to 20 carbon atoms, and which can be linear, para-oriented, or symmetrical. Examples of modifying aromatic dicarboxylic acids which may be used in this invention include, but are not limited to, isophthalic acid, 4,4'-biphenyldicarboxylic acid, 1,4-, 1,5-, 2,6-, 2,7-naphthalenedicarboxylic acid, and trans-4,4'-stilbenedicarboxylic acid, and esters thereof. In one embodiment, the modifying aromatic dicarboxylic acid is isophthalic acid.

The carboxylic acid component of the polyesters useful in the invention can be further modified with up to 10 mole %, such as up to 5 mole % or up to 1 mole % of one or more aliphatic dicarboxylic acids containing 2-16 carbon atoms, such as, for example, cyclohexanedicarboxylic, malonic, succinic, glutaric, adipic, pimelic, suberic, azelaic and dodecanedioic dicarboxylic acids. Certain embodiments can also comprise 0.01 to 10 mole %, such as 0.1 to 10 mole %, 1 or 10 mole %, 5 to 10 mole % of one or more modifying aliphatic dicarboxylic acids. Yet another embodiment contains 0 mole % modifying aliphatic dicarboxylic acids. The total mole % of the dicarboxylic acid component is 100 mole %. In one embodiment, adipic acid and/or glutaric acid are provided in the modifying aliphatic dicarboxylic acid component of the invention.

Esters of terephthalic acid and the other modifying dicarboxylic acids or their corresponding esters and/or salts may be used instead of the dicarboxylic acids. Suitable examples of dicarboxylic acid esters include, but are not limited to, the dimethyl, diethyl, dipropyl, diisopropyl, dibutyl, and diphenyl esters. In one embodiment, the esters are chosen from at least one of the following: methyl, ethyl, propyl, isopropyl, and phenyl esters.

For the desired polyester, the molar ratio of cis/trans 2,2,4,4-tetramethyl-1,3-cyclobutanediol can vary from the pure form of each and mixtures thereof. In certain embodiments, the molar percentages for cis and/or trans 2,2,4,4,-tetramethyl-1,3-cyclobutanediol are greater than 50 mole % cis and less than 50 mole % trans; or greater than 55 mole % cis and less than 45 mole % trans; or 50 to 70 mole % cis and 50 to 30 mole % trans; or 60 to 70 mole % cis and 30 to 40 mole % trans; or greater than 70 mole % cis and less than 30 mole % trans; wherein the total mole percentages for cis-and trans-2,2,4,4-tetramethyl-1,3-cyclobutanediol is equal to 100 mole %. In an additional embodiment, the molar ratio of cis/trans 2,2,4,4-tetramethyl-1,3-cyclobutanediol can vary within the range of 50/50 to 0/100, for example, between 40/60 to 20/80.

In one embodiment, the polyesters useful in the invention can comprise 1,4-cyclohexanedimethanol. In another embodiment, the polyesters useful in the invention comprise 1,4-cyclohexanedimethanol and 1,3-cyclohexanedimethanol. The molar ratio of cis/trans 1,4-cyclohexandimethanol can vary within the range of 50/50 to 0/100, for example, between 40/60 to 20/80.

In one embodiment, the glycol component of the polyester portion of the polyester compositions useful in the invention can contain up to 10 mole %, or 9 mole %, or 8 mole %, or 7 mole %, or 6 mole %, or less of one or more modifying glycols which are not 2,2,4,4-tetramethyl-1,3-cyclobutanediol or ethylene glycol. In one embodiment, the glycol component of the polyester portion of the polyester compositions useful in the invention can contain up to 5 mole %, or 4 mole %, or 3 mole %, or 2 mole %, or 1 mole %, or less of one or more modifying glycols which are not 2,2,4,4-tetramethyl-1,3-cyclobutanediol or ethylene glycol. In certain embodiments, the polyesters useful in the invention can contain 3 mole % or less of one or more modifying glycols. In another embodiment, the polyesters useful in the invention can contain 2 mole % or less of one or more modifying glycols. In another embodiment, the polyesters useful in the invention can contain 0 mole % modifying glycols. It is contemplated however that some other glycol residuals may form in situ. For example, a certain amount of DEG will typically formed in situ during the polymerization reactions. In some embodiments DEG can be intentionally added as a monomer to the reaction mixture, and in other embodiments no DEG is intentionally added, but a small amount of DEG residues may be present in the final copolymer due to in situ formation.

In embodiments, modifying glycols for use in the polyesters, if used, can include diols other than 2,2,4,4-tetramethyl-1,3-cyclobutanediol and ethylene glycol and can contain 2 to 16 carbon atoms. Examples of modifying glycols include, but are not limited to, cyclohexanedimethanol, diethylene glycol, 1,2-propanediol, 1,3-propanediol, neopentyl glycol, isosorbide, 1,4-butanediol, 1,5-pentanediol, 1,6-hexanediol, p-xylene glycol, polytetramethylene glycol, and mixtures thereof. In another embodiment, the modifying glycols include, but are not limited to, at least one of 1,3-propanediol and 1,4-butanediol. In one embodiment, at least one modifying glycol is diethylene glycol. In one embodiment, the diethylene glycol is not added as a separate monomer but is formed during polymerization.

In some embodiments, the polyesters according to the invention can comprise from 0 to 10 mole percent, for example, from 0.01 to 5 mole percent, from 0.01 to 1 mole percent, from 0.05 to 5 mole percent, from 0.05 to 1 mole percent, or from 0.1 to 0.7 mole percent, based the total mole percentages of either the dial or diacid residues; respectively, of one or more residues of a branching monomer, also referred to herein as a branching agent, having 3 or more carboxyl substituents, hydroxyl substituents, or a combination thereof. In certain embodiments, the branching monomer or agent may be added prior to and/or during and/or after the polymerization of the polyester. In emebodiments, the polyester(s) useful in the invention can thus be linear or branched.

Examples of branching monomers include, but are not limited to, multifunctional acids or multifunctional alcohols such as trimellitic acid, trimellitic anhydride, pyromellitic dianhydride, trimethylolpropane, glycerol, pentaerythritol, citric acid, tartaric acid, 3-hydroxyglutaric acid and the like. In one embodiment, the branching monomer residues can comprise 0.1 to 0.7 mole percent of one or more residues chosen from at least one of the following: trimellitic anhydride, pyromellitic dianhydride, glycerol, sorbitol, 1,2,6-hexanetriol, pentaerythritol, trimethylolethane, and/or trimesic acid. The branching monomer may be added to the polyester reaction mixture or blended with the polyester in the form of a concentrate as described, for example, in U.S. Pat. Nos. 5,654,347 and 5,696,176, whose disclosure regarding branching monomers is incorporated herein by reference.

The polyesters of the invention can comprise at least one chain extender. Suitable chain extenders include, but are not limited to, multifunctional (including, but not limited to, bifunctional) isocyanates, multifunctional epoxides, including for example epoxylated novolacs, and phenoxy resins. In certain embodiments, chain extenders may be added at the end of the polymerization process or after the polymerization process. If added after the polymerization process, chain extenders can be incorporated by compounding or by addition during conversion processes such as injection molding or extrusion. The amount of chain extender used can vary depending on the specific monomer composition used and the physical properties desired but is generally about 0.1 percent by weight to about 10 percent by weight, such as about 0.1 to about 5 percent by weight, based on the total weight of the polyester.

In one embodiment, certain polyesters useful in this invention can be visually clear. The term "visually clear" is defined herein as an appreciable absence of cloudiness, haziness, and/or muddiness, when inspected visually.

In one embodiment, the polyesters useful in the invention and/or the polyester compositions of the invention can have color values L*, a* and b* which can be determined using a Hunter Lab Ultrascan Spectra Colorimeter manufactured by Hunter Associates Lab Inc., Reston, Va. The color determinations are averages of values measured on either pellets of the polyesters or plaques or other items injection molded or extruded from them. They are determined by the L*a*b* color system of the CIE (International Commission on Illumination) (translated), wherein L* represents the lightness coordinate, a* represents the red/green coordinate, and b* represents the yellow/blue coordinate. In various embodiments, the color values can be determined for polymers having the presence of and/or in the absence of toner(s).

Deleterious color interactions are believed to occur with tin catalysts or with titanium catalysts used to prepare polyesters containing ethylene glycol. In one embodiment of this invention, the b* color values for the polyesters useful in the invention made using at least one titanium compound in combination with at least one phosphorus compound as described herein are believed to be a significant improvement over using tin catalysts in conjuction with phosphourus in the production of these polyesters with regards to a good TMCD incorporation (>50%), improved color (L*>90 and/or b*<10), and ability to build IV.

In one embodiment, the phosphorus compound(s) can be an organic compound such as, for example, a phosphorus acid ester containing halogenated or non-halogenated organic substituents. In embodiments, the phosphorus compound(s) can comprise a wide range of phosphorus compounds, for example, phosphines, phosphites, phosphinites, phosphonites, phosphinates, phosphonates, phosphine oxides, and phosphates.

Examples of phosphorus compounds that may be useful in the invention can include tributyl phosphate, triethyl phosphate, tri-butoxyethyl phosphate, t-butylphenyl diphenyl phosphate, 2-ethylhexyl diphenyl phosphate, ethyl dimethyl phosphate, isodecyl diphenyl phosphate, trilauryl phosphate, diphenyl phosphate, tricresyl phosphate, trixylenyl phosphate, t-butylphenyl diphenylphosphate, resorcinol bis(diphenyl phosphate), tribenzyl phosphate, phenyl ethyl phosphate, trimethyl thionophosphate, phenyl ethyl thionophosphate, dimethyl methylphosphonate, diethyl methylphosphonate, diethyl pentylphosphonate, dilauryl methylphosphonate, diphenyl methylphosphonate, dibenzyl methylphosphonate, diphenyl cresylphosphonate, dimethyl cresylphosphonate, dimethyl methylthionophosphonate, phenyl diphenylphosphinate, benzyl diphenylphosphinate, methyl diphenylphosphinate, trimethyl phosphine oxide, triphenyl phosphine oxide, tribenzyl phosphine oxide, 4-methyl diphenyl phosphine oxide, triethyl phosphite, tributyl phosphite, trilauryl phosphite, triphenyl phosphite, tribenzyl phosphite, phenyl diethyl phosphite, phenyl dimethyl phosphite, benzyl dimethyl phosphite, dimethyl methylphosphonite, diethyl pentylphosphonite, diphenyl methylphosphonite, dibenzyl methylphosphonite, dimethyl cresylphosphonite, methyl dimethylphosphinite, methyl diethylphosphinite, phenyl diphenylphosphinite, methyl diphenylphosphinite, benzyl diphenylphosphinite, triphenyl phosphine, tribenzyl phosphine, and methyl diphenyl phosphine. In one embodiment, triphenyl phosphine oxide is excluded as a thermal stabilizer in the process(es) of making the polyesters of the invention and/or in the polyester composition(s) of the invention.

In one embodiment, phosphorus compounds useful in the invention can be any of the previously described phosphorus-based acids wherein one or more of the hydrogen atoms of the acid compound (bonded to either oxygen or phosphorus atoms) are replaced with alkyl, branched alkyl, substituted alkyl, alkyl ethers, substituted alkyl ethers, alkyl-aryl, alkyl-substituted aryl, aryl, substituted aryl, and mixtures thereof. In another embodiment, phosphorus compounds useful in the invention, include but are not limited to, the above described compounds wherein at least one of the hydrogen atoms bonded to an oxygen atom of the compound is replaced with a metallic ion or an ammonium ion.

The esters can contain alkyl, branched alkyl, substituted alkyl, alkyl ethers, aryl, and/or substituted aryl groups. The esters can also have at least one alkyl group and at least one aryl group. The number of ester groups present in the particular phosphorus compound can vary from zero up to the maximum allowable based on the number of hydroxyl groups present on the phosphorus compound used. For example, an alkyl phosphate ester can include one or more of the mono-, di-, and tri alkyl phosphate esters; an aryl phosphate ester includes one or more of the mono-, di-, and tri aryl phosphate esters; and an alkyl phosphate ester and/or an aryl phosphate ester also include, but are not limited to, mixed alkyl aryl phosphate esters having at least one alkyl and one aryl group.

In one embodiment, the phosphorus compounds useful in the invention include but are not limited to alkyl, aryl or mixed alkyl aryl esters or partial esters of phosphoric acid, phosphorus acid, phosphinic acid, phosphonic acid, or phosphonous acid. The alkyl or aryl groups can contain one or more substituents.

In one aspect, the phosphorus compounds useful in the invention comprise at least one phosphorus compound chosen from at least one of substituted or unsubstituted alkyl phosphate esters, substituted or unsubstituted aryl phosphate esters, substituted or unsubstituted mixed alkyl aryl phosphate esters, diphosphites, salts of phosphoric acid, phosphine oxides, and mixed aryl alkyl phosphites, reaction products thereof, and mixtures thereof. The phosphate esters include esters in which the phosphoric acid is fully esterified or only partially esterified.

In one embodiment, for example, the phosphorus compounds useful in the invention can include at least one phosphate ester.

In one aspect, the phosphorus compounds useful in the invention comprise at least one phosphorus compound chosen from at least one of substituted or unsubstituted alkyl phosphate esters, substituted or unsubstituted aryl phosphate esters, substituted or unsubstituted mixed alkyl aryl phosphate esters, reaction products thereof, and mixtures thereof. The phosphate esters include esters in which the phosphoric acid is fully esterified or only partially esterified.

In one embodiment, for example, the phosphorus compounds useful in the invention can include at least one phosphate ester.

In another embodiment, the phosphate esters useful in the invention can include but are not limited to alkyl phosphate esters, aryl phosphate esters, mixed alkyl aryl phosphate esters, and/or mixtures thereof.

In certain embodiments, the phosphate esters useful in the invention are those where the groups on the phosphate ester include are alkyl, alkoxy-alkyl, phenyl, or substituted phenyl groups. These phosphate esters are generally referred to herein as alkyl and/or aryl phosphate esters. Certain preferred embodiments include trialkyl phosphates, triaryl phosphates, alkyl diaryl phosphates, dialkyl aryl phosphates, and mixtures of such phosphates, wherein the alkyl groups are preferably those containing from 2 to 12 carbon atoms, and the aryl groups are preferably phenyl.

Representative alkyl and branched alkyl groups are preferably those containing from 1-12 carbon atoms, including, but not limited to, ethyl, propyl, isopropyl, butyl, hexyl, cyclohexyl, 2-ethylhexyl, octyl, decyl and dodecyl. Substituted alkyl groups include, but are not limited to, those containing at least one of carboxylic acid groups and esters thereof, hydroxyl groups, amino groups, keto groups, and the like.

Representative of alkyl-aryl and substituted alkyl-aryl groups are those wherein the alkyl portion contains from 1-12 carbon atoms, and the aryl group is phenyl or substituted phenyl wherein groups such as alkyl, branched alkyl, aryl, hydroxyl, and the like are substituted for hydrogen at any carbon position on the phenyl ring. Preferred aryl groups include phenyl or substituted phenyl wherein groups such as alkyl, branched alkyl, aryl, hydroxyl and the like are substituted for hydrogen at any position on the phenyl ring.

In one embodiment, the phosphate esters useful in the invention include but are not limited to dibutylphenyl phosphate, diphenyl phosphate, tricresyl phosphate, tributyl phosphate, tri-2-ethylhexyl phosphate, trioctyl phosphate, and/or mixtures thereof, including particularly mixtures of tributyl phosphate and tricresyl phosphate, and mixtures of isocetyl diphenyl phosphate and 2-ethylhexyl diphenyl phosphate.

In one embodiment, at least one phosphorus compound useful in the invention comprises at least one aryl phosphate ester.

In one embodiment, at least one phosphorus compound useful in the invention comprises at least one unsubstituted aryl phosphate ester.

In one aspect, at least one phosphorus compound useful in the invention comprises at least one aryl phosphate ester which is not substituted with benzyl groups.

In one aspect, any of the phosphorus compounds useful in the invention may comprise at least one alkyl phosphate ester.

In one embodiment, the phosphate esters useful in the invention as thermal stabilizers and/or color stabilizers include but are not limited to, at least one of the following: trialkyl phosphates, triaryl phosphates, alkyl diaryl phosphates, and mixed alkyl aryl phosphates.

In one embodiment, the phosphate esters useful in the invention as thermal stabilizers and/or color stabilizers include but are not limited to, at least one of the following: triaryl phosphates, alkyl diaryl phosphates, and mixed alkyl aryl phosphates.

In one embodiment, the phosphate esters useful as thermal stabilizers and/or color stabilizers in the invention can include but are not limited to, at least one of the following: triaryl phosphates and mixed alkyl aryl phosphates.

In one embodiment, at least one phosphorus compound useful in the invention can comprise, but is not limited to, triaryl phosphates, such as, for example, triphenyl phosphate. In one embodiment, at least one thermal stabilizer comprises, but is not limited to Merpol A. In one embodiment, at least one thermal stabilizer useful in the invention comprises, but is not limited to, at least one of triphenyl phosphate and Merpol A. Merpol A is a phosphate ester commercially available from Stepan Chemical Co and/or E.I. duPont de Nemours & Co. The CAS Registry number for Merpol A is believed to be CAS Registry #37208-27-8.

In one aspect, any of the phosphorus compounds useful in the invention may comprise at least one triaryl phosphate ester which is not substituted with benzyl groups.

In one embodiment, the polyester compositions and/or processes of the invention may comprise 2-ethylhexyl diphenyl phosphate.

In one embodiment, any of the processes described herein for making any of the polyester compositions and/or polyesters can comprise at least one mixed alkyl aryl phosphite, such as, for example, bis(2,4-dicumylphenyl)pentaerythritol diphosphite also known as Doverphos S-9228 (Dover Chemicals, CAS #15486243-8).

In one embodiment, any of the processes described herein for making any of the polyester compositions and/or polyesters can comprise at least one one phosphine oxide.

In one embodiment, any of the processes described herein for making any of the polyester compositions and/or polyesters can comprise at least one salt of phosphoric acid such as, for example, $KH_2PO_4$ and $Zn_3(PO_4)_2$.

The term "thermal stabilizer" is intended to include the reaction product(s) thereof. The term "reaction product" as used in connection with the thermal stabilizers of the invention refers to any product of a polycondensation or esterification reaction between the thermal stabilizer and any of the monomers used in making the polyester as well as the product of a polycondensation or esterification reaction between the catalyst and any other type of additive.

In one embodiment of the invention, the phosphorus compounds useful in the invention may act as thermal stabilizers. In one embodiment of the invention, the phosphorus compounds useful in the invention may not act as a thermal stabilizer but may act as a color stabilizer. In one embodiment of the invention, the phosphorus compounds useful in the invention may act as both a thermal stabilizer and a color stabilizer.

When phosphorus is added to the polyesters and/or polyester compositions and/or process of making the polyesters of the invention, it is added in the form of a phosphorus compound, for example, at least one phosphate ester(s). The amount of phosphorus compound(s), (for example, at least one phosphate ester), is added to the polyesters of the invention and/or polyester compositions of the invention and/or processes of the invention can be measured in the form of phosphorus atoms present in the final polyester, for example, by weight measured in ppm.

In one embodiment, amounts of the phosphate ester of the invention added during polymerization are chosen from the following: 10 to 200 ppm based on the total weight of the polyester composition and as measured in the form of phosphorus atoms in the final polyester. In embodiments of the invention, phosphorous can be present in an amount of 10 to 100, or 10 to 80, or 10 to 60, or 10 to 55, or 15 to 55, or 18 to 52, or 20 to 50 ppm, based on the total weight of the polyester composition and as measured in the form of phosphorus atoms in the final polyester.

In one embodiment, the catalyst system contains a titanium compound. In one embodiment, the titanium compound can be used in either the esterification reaction or the polycondensation reaction or both reactions. In one embodiment, the catalyst system contains a titanium compound used in the esterification reaction. In one embodiment, the catalyst system contains a titanium compound used in the polycondensation reaction. In one embodiment, less than about 50 ppm elemental titanium can be present as residue in the polyester based on the total weight of the polyester.

In embodiments, titanium amounts can range from 10 ppm to 50 ppm based on the catalyst metal and based on the weight of the final polymer.

In embodiments of the invention, titanium can be present in an amount of 15 to 48, or 15 to 45, or 20 to 35, or 20 to 30, or 15 to 30 ppm, based on the total weight of the polyester composition and as measured in the form of titanium atoms in the final polyester. The process can be carried out in either a batch or continuous process. In one embodiment, the process is carried out in a continuous process.

When titanium is added to the polyesters and/or polyester compositions and/or process of making the polyesters of the invention, it is added to the process of making the polyester in the form of a titanium compound. The amount of the titanium compound added to the polyesters of the invention and/or polyester compositions of the invention and/or processes of the invention can be measured in the form of titanium atoms present in the final polyester, for example, by weight measured in ppm.

In another embodiment, the catalyst mixture contains a titanium compound used in the esterification reaction in the amount of 10 ppm to 50 ppm based on the weight of the final polyester, as measured in the form of titanium atoms in the final polyester.

The titanium-containing compounds useful in this invention include any compound containing titanium including but not limited to: tetraethyl titanate, acetyltripropyl titanate, tetrapropyl titanate, tetrabutyl titanate, polybutyl titanate, 2-ethylhexyltitanate, octyleneglycol titanate, lactate titanate, triethanolamine titanate, acetylacetonate titanate, ethylacetoacetic ester titanate, isostearyl titanate, acetyl triisopropyl titanate, titanium tetraisopropoxide titanium glycolates, titanium butoxide, hexylene glycol titanate, and tetrasiooctyl titanate, titanium dioxide, titanium dioxide/silicon dioxide coprecipitates, and titanium dioxide/zirconium dioxide coprecipitates. This invention includes but is not limited to the titanium dioxide/silicon dioxide coprecipitate catalyst described in U.S. Pat. No. 6,559,272.

In one embodiment, the catalyst mixture contains a manganese compound. In one embodiment, the manganese compound can be used in either the esterification reaction or the polycondensation reaction or both reactions. In one embodiment, the catalyst system contains a manganese compound used in the esterification reaction. In one embodiment, the catalyst mixture contains a manganese compound used in the polycondensation reaction. Generally, in one embodiment, less than about 100 ppm elemental manganese can be present as residue in the polyester based on the total weight of the polyester.

Manganese amounts can range from 10 ppm to 100 ppm based on the catalyst metal and based on the weight of the final polymer. In embodiments of the invention, manganese can be present in an amount of 10 to 60, or 10 to 55, or 11 to 55, or 15 to 55 ppm, based on the total weight of the polyester composition and as measured in the form of manganese atoms in the final polyester. The process can be carried out in either a batch or continuous process. In one embodiment, the process is carried out in a continuous process.

In embodiments, manganese can be added in the form of a manganese salt. In embodiments, examples of useful mangagese salts include manganese(II) diacetate, manganese benzoate, manganese octoate, manganese caproate, manganese 2-diethyl hexoate, manganese lineolate, managnese stearate, manganese napthenate, and combinations thereof.

In one embodiment, suitable catalysts for use in the processes of the invention to make the polyesters useful in the invention include at least one titanium compound and one manganese compound. In certain embodiments, other catalysts could possibly be used in the invention in combination with the at least one titanium compound and the at least one manganese compound. Other catalysts may include, but are not limited to, those based on gallium, zinc, antimony, cobalt, magnesium, germanium, lithium, aluminum compounds, and an aluminum compound with lithium hydroxide or sodium hydroxide.

The polyester portion of the polyester compositions useful in the invention can be made by processes known from the literature such as, for example, by processes in homogenous solution, by transesterification processes in the melt, and by two phase interfacial processes. Suitable methods include, but are not limited to, the steps of reacting one or more dicarboxylic acids with one or more glycols at a temperature of 100° C. to 315° C. at a pressure of 0.1 to 760 mm Hg for a time sufficient to form a polyester. See U.S. Pat. No. 3,772,405 for methods of producing polyesters, the disclosure regarding such methods is hereby incorporated herein by reference.

The polyester in general may be prepared by condensing the dicarboxylic acid or dicarboxylic acid ester with the glycol in the presence of the titanium catalyst (and optionally titanium and manganese catalysts), as described herein, at elevated temperatures increased gradually during the course of the condensation up to a temperature of about 225°-310° C., in an inert atmosphere, and conducting the condensation at low pressure during the latter part of the condensation, as described in further detail in U.S. Pat. No. 2,720,507 incorporated herein by reference.

In another aspect, this invention relates to a process for preparing copolyesters of the invention. In one embodiment, the process relates to preparing copolyesters comprising terephthalic acid, 2,2,4,4-tetramethyl-1,3-cyclobutanediol, and ethylene glycol. In embodiments, this process comprises the steps of:

(A) heating a mixture comprising the monomers useful in the polyesters of the invention in the presence of at least one titanium catalyst and at least one phosphate ester at a temperature of 150 to 250° C. for a time sufficient to produce an initial polyester;

(B) polycondensing the product of Step (A) by heating it at a temperature of 230 to 320° C. for 1 to 6 hours; and (C) removing any unreacted glycols.

Reaction times for the esterification Step (A) are dependent upon the selected temperatures, pressures, and feed mole ratios of glycol to dicarboxylic acid.

In one embodiment, step (A) can be carried out until 50% by weight or more of the 2,2,4,4-tetramethyl-1,3-cyclobutanediol has been reacted. Step (A) may be carried out under pressure, ranging from 0 psig to 100 psig. The term "reaction product" as used in connection with any of the catalysts useful in the invention refers to any product of a polycondensation or esterification reaction with the catalyst arid any of the monomers used in making the polyester as well as the product of a polycondensation or esterification reaction between the catalyst and any other type of additive.

In embodiments, Step (B) and Step (C) can be conducted at the same time. These steps can be carried out by methods known in the art such as by placing the reaction mixture under a pressure ranging, from 0.002 psig to below atmospheric pressure, or by blowing hot nitrogen gas over the mixture.

In one embodiment, the invention relates to a process, hereinafter referred to as "PROCESS COMPRISING TITANIUM", for making a polyester comprising the following steps:

(I) heating a mixture at least one temperature chosen from 150° C. to 250° C., under at least one pressure chosen from the range of 0 psig to 75 psig wherein said mixture comprises:
  (a) a dicarboxylic acid component comprising:
    (i) about 90 to about 100 mole % of terephthalic acid residues;
    (ii) about 0 to about 10 mole % of aromatic and/or aliphatic dicarboxylic acid residues having up to 20 carbon atoms; and
  (b) a glycol component comprising:
    (i) about 10 to 27 mole % 2,2,4,4-tetramethyl-1,3-cyclobutanediol residues; and
    (ii) about 90 to about 73 mole % ethylene glycol residues, and
    (iii) less than about 2 mole % of a modifying glycol having from 3 to 16 carbon atoms;
  wherein the molar ratio of glycol component/dicarboxylic acid component added in Step (I) is 1.01-3.0/1.0 and wherein TMCD is added in an amount from about 10 to 54 mole %, to allow for about 50 to 100% conversion of TMCD in the reaction arid to arrive at a final polymer having about 10 to 27 mole % 2,2,4,4-tetramethyl-1,3-cyclobutanediol residues;
  wherein the mixture in Step (I) is heated in the presence of:
    (i) at least one catalyst comprising at least one titanium compound, and optionally, at least one manganese compound; and (ii) at least one phosphorus compound, reaction products thereof, and mixtures thereof;

(II) heating the product of Step (I) at a temperature of 230° C. to 320° C. for 1 to 6 hours, under at least one pressure chosen from the range of the final pressure of Step (I) to 0.02 torr absolute, to form a final polyester;
wherein the total mole % of the dicarboxylic acid component of the final polyester is 100 mole %; and
wherein the total mole % of the glycol component of the final polyester is 100 mole %; and
wherein the inherent viscosity of the polyester is from 0.50 to 0.8 dL/g as determined in 60/40 (wt/wt) phenol/tetrachloroethane at a concentration of 0.25 g/50 ml at 25° C.

In the processes of the invention referred to as "PROCESS COMPRISING TITANIUM", at least one phosphorus compound, for example, at least one phosphate ester, can be added to Step (I), Step (II) and/or Steps (I) and (II) and/or after Steps (I) and/or (II). In certain embodiments, at least one phosphorus compound can be added to only Step (I) or only Step (II).

In embodiments of the invention, at least one phosphorus compound, reaction products thereof, and mixtures thereof can be added either during esterification, polycondensation, or both and/or it can be added post-polymerization. In one embodiment, the phosphorus compound useful in any of the processes of the invention can be added during esterification. In one embodiment, if the phosphorus compound added after both esterification and polycondensation, it is added in the amount of 0 to 2 weight % based on the total weight of the final polyester. In one embodiment, if the phosphorus compound added after both esterification and polycondensation, it is added in the amount of 0.01 to 2 weight % based on the total weight of the final polyesterin one embodiment, the phosphorus compound can comprise at least one phosphate ester. In one embodiment, the phosphorus compound can comprise at least one phosphorus compound which is added during the esterification step. In one embodiment, the phosphorus compound can comprise at least one phosphate ester, for example, which is added during the esterification step.

It is believed that the processes of making the polyesters described herein may be used to make the polyesters useful in the invention.

Reaction times for the esterification Step (I) of any of the processes of the invention are dependent upon the selected temperatures, pressures, and feed mole ratios of glycol to dicarboxylic acid.

In one embodiment, the pressure used in Step (II) of any of the processes of the invention consists of at least one pressure chosen from 20 torr absolute to 0.02 torr absolute; in one embodiment, the pressure used in Step (II) of any of the processes of the invention consists of at least one pressure chosen from 10 torr absolute to 0.02 torr absolute; in one embodiment, the pressure used in Step (II) of any of the processes of the invention consists of at least one pressure chosen from 5 torr absolute to 0.02 torr absolute; in one embodiment, the pressure used in Step (II) of any of the processes of the invention consists of at least one pressure chosen from 3 torr absolute to 0.02 torr absolute; in one embodiment, the pressure used in Step (II) of any of the processes of the invention consists of at least one pressure chosen from 20 torr absolute to 0.1 torr absolute; in one embodiment, the pressure used in Step (II) of any of the processes of the invention consists of at least one pressure chosen from 10 torr absolute to 0.1 torr absolute; in one embodiment, the pressure used in Step (II) of any of the processes of the invention consists of at least one pressure chosen from 5 torr absolute to 0.1 torr absolute; in one embodiment, the pressure used in Step (II) of any of the processes of the invention consists of at least one pressure chosen from 3 torr absolute to 0.1 torr absolute.

In one embodiment, the molar ratio of glycol component/dicarboxylic acid component added in Step (I) of a process of the invention is 1.0-2.0/1.0; in one embodiment, the molar ratio of glycol component/dicarboxylic acid component added in Step (I) of a process of the invention is 1.01-2.0/1.0; in one embodiment, the molar ratio of glycol component/dicarboxylic acid component added in Step (I) of a process of the invention is 1.01-1.75/1.0; in one embodiment, the molar ratio of glycol component/dicarboxylic acid component added in Step (I) of a process of the invention is 1.01-1.7/1.0; in one embodiment, the molar ratio of glycol component/dicarboxylic acid component added in Step (I) of a process of the invention is 1.01-1.5/1.0; in one embodiment, the molar ratio of glycol component/dicarboxylic acid component added in Step (I) of a process of the invention is 1.01-1.2/1.0.

In embodiments of the invention for the process for making the polyesters, the heating time of Step (II) may be from 1 to 5 hours or 1 to 4 hours or 1 to 3 hours or 1.5 to 3 hours or 1 to 2 hours. In one embodiment, the heating time of Step (II) can be from 1.5 to 3 hours.

In one aspect, the polyesters, polyester compositions and/or processes of the invention useful in the invention can comprise phosphorus atoms, titanium atoms, and manganese atoms.

In one embodiment, the polyester(s), polyester compositions and/or processes of making the polyesters useful in the invention may comprise at least one titanium compound, at least one manganese compound, and at least one phosphorus compound.

In one embodiment, the addition of the phosphorus compound(s) in the process(es) of the invention can result in a weight ratio of total phosphorus atoms to total titanium and manganese atoms in the final polyester of 0.5-2.0:1. In embodiments of the invention, phosphorus is present in a weight ratio of total phosphorus atoms to total titanium and manganese atoms in the final polyester of 0.1-5:1, or 0.2-5:1, or 0.3-2:1, or 0.3-1:1, or 0.5-0.9:1, or 0.6-0.9:1, or 0.7-0.9:1, or 0.8-0.9:1.

In one embodiment, the amount of titanium atoms in the polyesters useful in the invention can be from 15 to 50 ppm titanium atoms based on the weight of the final polyester.

In one embodiment, the amount of manganese atoms in the polyesters useful in the invention can be from 10 to 100 ppm manganese atoms based on the weight of the final polyester.

In one embodiment, the amount of phosphorus atoms in the polyesters useful in the invention can be from 10 to 200 ppm phosphorus atoms based on the weight of the final polyester.

The invention further relates to the polyester compositions made by the process(es) described above.

In embodiments of the invention, certain agents which colorize the polymer can be added to the melt. In one embodiment, a bluing toner is added to the melt in order to reduce the b* of the resulting polyester polymer melt phase product. Such bluing agents include blue inorganic and organic toner(s). In addition, red toner(s) can also be used to adjust the a* color. Organic toner(s), e.g., blue and red organic toner(s), such as those toner(s) described in U.S. Pat. Nos. 5,372,864 and 5,384,377, which are incorporated by reference in their entirety, can be used. The organic toner(s) can be fed as a premix composition. The premix composition may be a neat blend of the red and blue compounds or the composition may be pre-dissolved or slurried in one of the polyester's raw materials, e.g., ethylene glycol.

The total amount of toner components added can depend on the amount of inherent yellow color in the base polyester and the efficacy of the toner. In one embodiment, a concentration of up to about 15 ppm of combined organic toner components and a minimum concentration of about 0.5 ppm are used. In one embodiment, the total amount of bluing additive can range from 0.5 to 10 ppm. In an embodiment, the toner(s) can be added to the esterification zone or to the polycondensation zone. Preferably, the toner(s) are added to the esterification zone or to the early stages of the polycondensation zone, such as to a prepolymerization reactor.

The invention further relates to a polymer blend. In embodiments, the blend comprises:
(a) from 5 to 95 weight % of at least one of the polyesters described above; and
(b) from 5 to 95 weight % of at least one polymeric component.

Suitable examples of the polymeric components include, but are not limited to, nylon; polyesters different than those described herein such as PET; polyamides such as ZYTEL® from DuPont; polystyrene; polystyrene copolymers; styrene acrylonitrile copolymers; acrylonitrile butadiene styrene copolymers; poly(methylmethacrylate); acrylic copolymers; poly(ether-imides) such as ULTEM® (a poly(ether-imide) from General Electric); polyphenylene oxides such as poly(2,6-dimethylphenylene oxide) or poly(phenylene oxide)/polystyrene blends such as NORYL 1000® (a blend of poly(2,6-dimethylphenylene oxide) and polystyrene resins from General Electric); polyphenylene sulfides; polyphenylene sulfide/sulfones; poly(ester-carbonates); polycarbonates such as LEXAN® (a polycarbonate from General Electric); polysulfones; polysulfone ethers; and poly(ether-ketones) of aromatic dihydroxy compounds; or mixtures of any of the foregoing polymers. The blends can be prepared by conventional processing techniques known in the art, such as melt blending or solution blending.

In embodiments, the polyester compositions and the polymer blend compositions can also contain from 0.01 to 25% by weight of the overall composition common additives such as colorants, toner(s), dyes, mold release agents, flame retardants, plasticizers, nucleating agents, stabilizers, including but not limited to, UV stabilizers, thermal stabilizers other than the phosphorus compounds describe herein, and/or reaction products thereof, fillers, and impact modifiers. Examples of commercially available impact modifiers include, but are not limited to, ethylene/propylene terpolymers, functionalized polyolefins such as those containing methyl acrylate and/or glycidyl methacrylate, styrene-based block copolymeric impact modifiers, and various acrylic core/shell type impact modifiers. Residues of such additives are also contemplated as part of the polyester composition.

Reinforcing materials may be added to the compositions of this invention. The reinforcing materials may include, but are not limited to, carbon filaments, silicates, mica, clay, talc, titanium dioxide, Wollastonite, glass flakes, glass beads and fibers, and polymeric fibers and combinations thereof. In one embodiment, the reinforcing materials include glass, such as, fibrous glass filaments, mixtures of glass and talc, glass and mica, and glass and polymeric fibers.

In one aspect, the invention relates to the film(s) and/or sheet(s) comprising the polyester compositions and/or polymer blends of the invention. The methods of forming the polyesters and/or blends into film(s) and/or sheet(s) are well known in the art. Examples of film(s) and/or sheet(s) of the invention including but not limited to extruded film(s) and/or sheet(s), calendered film(s) and/or sheet(s), compression molded film(s) and/or sheet(s), solution casted film(s) and/or sheet(s). Methods of making film and/or sheet include but are not limited to extrusion, calendering, compression molding, and solution casting.

In one embodiment, polyester compositions containing TMCD and EG that provide improved calendering processes without the need for a branching monomer or branching agent are provided. In embodiments, the polyester compositions for calendering comprise: (a) at least one polyester comprising diacid residues, diol residues in which the polyester has a crystallization half time of at least 5 minutes and an inherent viscosity of about 0.50 to about 0.80 dL/g; and (b) at least one release additive effective to prevent sticking of the polyester to calendering rolls. It is believed the polyester compositions of the present disclosure have an unexpected combination of excellent melt strength and melt viscosity with a good shear response that allows higher calendering line speeds before melt fracture occurs. Higher calendering line speeds, in turn, provides for more economical production of polyester sheet or film in commercial applications. In various embodiments, any of the types and/or amounts of diacid residues and diol residues discussed herein can be used for the polyester calendering compositions. In one embodiment, the polyester calendering composition does not contain any branching monmers or agents.

Examples of potential articles made from film and/or sheet useful in the invention include, but are not limited, to thermoformed sheet, graphic arts film, outdoor signs, ballistic glass, skylights, coating(s), coated articles, painted articles, shoe stiffeners, laminates, laminated articles, medical packaging, general packaging, shrink films, pressure sensitive labels, stretched or stretchable films or sheets, uniaxially or biaxially oriented films, and/or multiwall films or sheets.

In one aspect, the invention relates to injection molded articles comprising the polyester compositions and/or polymer blends of the invention. Injection molded articles can include injection stretch blow molded bottles, sun glass frames, lenses, sports bottles, drinkware, food containers, medical devices and connectors, medical housings, electronics housings, cable components, sound dampening articles, cosmetic containers, wearable electronics, toys, promotional goods, appliance parts, automotive interior parts, and consumer houseware articles.

In embodiments of the invention, certain polyesters and/or polyester compositions of the invention can have a unique combination of all of the following properties: certain notched Izod impact strength, certain inherent viscosities, certain glass transition temperature (Tg), certain flexural modulus, good clarity, and good color.

In one embodiment, the processes of making the polyesters useful in the invention can comprise a batch or continuous process.

In one embodiment, the processes of making the polyesters useful in the invention comprise a continuous process.

In embodiments of the invention, the Tg of the polyesters can be chosen from one of the following ranges: 85 to 100° C.; 86 to 99° C.; 87 to 98° C.; 88 to 97° C.; 89 to 96° C.; 90 to 95° C.; 91 to 95° C.; 92 to 94° C.

In aspects of the invention, the glycol component for the polyesters includes but is not limited to at least one of the following combinations of ranges: 10 to 30 mole % 2,2,4,4-tetramethyl-1,3-cyclobutanediol and 70 to 90 mole % ethylene glycol; 10 to 27 mole % 2,2,4,4-tetramethyl-1,3-cyclobutanediol and 73 to 90 mole % ethylene glycol; 15 to 27 mole % 2,2,4,4-tetramethyl-1,3-cyclobutanediol and 73 to 85 mole % ethylene glycol; 18 to 27 mole % 2,2,4,4-tetramethyl-1,3-cyclobutanediol and 73 to 82 mole % ethylene glycol; 19 to 26 mole % 2,2,4,4-tetramethyl-1,3-cyclobutanediol and 74 to 81 mole % ethylene glycol; 20 to 25 mole % 2,2,4,4-tetramethyl-1,3-cyclobutanediol and 75 to 80 mole % ethylene glycol; 21 to 24 mole % 2,2,4,4-tetramethyl-1,3-cyclobutanediol and 76 to 79 mole % ethylene glycol; and 22 to 23 mole % 2,2,4,4-tetramethyl-1,3-cyclobutanediol and 77 to 78 mole % ethylene glycol.

For embodiments of the invention, the polyesters useful in the invention may exhibit at least one of the following inherent viscosities as determined in 60/40 (wt/wt) phenol/tetrachloroethane at a concentration of 0.25 g/50 ml at 25° C.: 0.50 to 0.80 dL/g; 0.50 to 0.75 dL/g; 0.55 to 0.70 dL/g; 0.57 to 0.68 dL/g; 0.58 to 0.67 dL/g; 0.58 to 0.66 dL/g.

In embodiments of the invention, the polyesters may exhibit at least one of the following inherent viscosities as determined in 60/40 (wt/wt) phenol/tetrachloroethane at a concentration of 0.25 g/50 ml at 25° C.: 0.60 to 0.70 dL/g; 0.62 to 0.68 dL/g; 0.63 to 0.67 dL/g; 0.64 to 0.66 dL/g; about 0.65 dL/g.

It is contemplated that compositions useful in the invention can possess at least one of the inherent viscosity ranges described herein and at least one of the monomer ranges for the compositions described herein unless otherwise stated. It is also contemplated that compositions useful in the invention can possess at least one of the $T_g$ ranges described herein and at least one of the monomer ranges for the compositions described herein unless otherwise stated. It is also contemplated that compositions useful in the invention can possess at least one of the inherent viscosity ranges described herein, at least one of the $T_g$ ranges described herein, and at least one of the monomer ranges for the compositions described herein unless otherwise stated.

In embodiments of the invention, the polyester can comprise: a glycol component that includes 15 to 27 mole % 2,2,4,4-tetramethyl-1,3-cyclobutanediol and 73 to 85 mole % ethylene glycol, an inherent viscosity of 0.60 to 0.70 dL/g and a Tg of 90 to 96° C.; or a glycol component that includes 20 to 25 mole % 2,2,4,4-tetramethyl-1,3-cyclobutanediol and 75 to 80 mole % ethylene glycol, an inherent viscosity of 0.63 to 0.67 dL/g and a Tg of 92 to 94° C.

The glass transition temperature ($T_g$) of the polyesters is determined using a TA DSC 2920 from Thermal Analyst Instrument at a scan rate of 20° C./min.

Because of the long crystallization half-times (e.g., greater than 5 minutes) at 170° C. exhibited by certain polyesters useful in the present invention, it can be possible to produce articles, including but not limited to, injection molded parts, injection blow molded articles, injection stretch blow molded articles, extruded film, calendered film, shrink films, pressure sensitive labels, extruded sheet, extrusion blow molded articles, extrusion stretch blow molded articles, and fibers. A thermoformable sheet is an example of an article of manufacture provided by this invention. The polyesters of the invention can be amorphous or semicrystalline. In one aspect, certain polyesters useful in the invention can have relatively low crystallinity. Certain polyesters useful in the invention can thus have a substantially amorphous morphology, meaning that the polyesters comprise substantially unordered regions of polymer.

In one embodiment, when having a pre-oriented thickness of about 100 to 400 microns and then oriented on a tenter frame at from a ratio of 5:1 to 3:1 at a temperature of from 100° C. to 125° C. or at a temperature from 104° C. to 114° C. to a thickness of from about 20 to about 80 microns, shrink films made from the polyesters/polyester compositions of the invention can have one or more of the following properties: (1) transverse direction shrinkage of from about 20% to 70% and from 2% shrinkage in the machine direction to 15% growth in the machine direction when immersed in water at 95° C. for 10 seconds; (2) shrinkage in the transverse direction in the amount of 35% to 85% and 4% shrinkage in the machine direction to 15% growth in the machine direction over a range of 95 to 125° C. in a hot air oven; (3) a Young's modulus of from 1500 to 5000 MPa at stretching speeds of from 300 mm/minute to 500 mm/minute in the transverse direction according to ASTM Method D882 and a Young's modulus of from 1500 to 2300 MPa at stretching speeds of from 300 mm/minute to 500 mm/minute in the machine direction according to ASTM Method D882; (4) a shrink initiation temperature of from about 70° C. to about 90° C.; (5) a break strain percentage of 15% to 170% at stretching speeds of from 300 mm/minute to 500 mm/minute in the transverse direction or in the machine direction or in both directions according to ASTM Method D882; (6) no more than 30% shrinkage per each 5° C. temperature increase increment; and/or (7) an L* color value is 90 or greater, as determined by the L*a*b* color system measured following ASTM D 6290-98 and ASTM E308-99, using measurements from a Hunter Lab Ultrascan XE Spectrophotometer with the following parameters: (i) D65 illuminant, (ii) 10 degree observer, (iii) transmittance mode with specular angle included, (iv) large area view, (v) 1" port size, and where the measurements were performed on film. Any combination of these properties or each of these properties can be present in the shrink films in accordance with the invention. In certain embodiments, properties (1)-(3) are present in the shrink films of the invention. In certain embodiments, properties (1)-(4) are present in the shrink films of the invention. In certain embodiments, properties (1)-(4), and (7) are present in the shrink films of the invention.

In certain embodiments, the shrink film can be made from a polyester having a glycol component that includes 10 to 29 mole % 2,2,4,4-tetramethyl-1,3-cyclobutanediol and 71 to 90 mole % ethylene glycol, or 10 to 28 mole % 2,2,4,4-tetramethyl-1,3-cyclobutanediol and 72 to 90 mole % ethylene glycol, or 10 to 27 mole % 2,2,4,4-tetramethyl-1,3-cyclobutanediol and 73 to 90 mole % ethylene glycol, or 10 to 26 mole % 2,2,4,4-tetramethyl-1,3-cyclobutanediol and 74 to 90 mole % ethylene glycol.

In one embodiment, the shrinkage properties of the oriented film used to make the shrink film in accordance with this invention are not adjusted by annealing the film at a temperature higher than the temperature in which it was oriented. In one embodiment, the shrinkage properties of the oriented film used to make the shrink films of this invention may be adjusted by annealing the film at a temperature higher than the temperature in which it was oriented. It is believed that annealing the oriented film at a temperature higher than the temperature in which it was oriented may affect the shrink properties.

In certain embodiments, the b* values for the polyesters useful in the invention can be from -12 to less than 12 and the L* values can be from greater than 80, or greater than 85, or greater than 90, or greater than 91, or greater than 92, or greater than 93, or greater than 94, or greater than 95. In other embodiments, the b* values for the polyesters useful in the invention can be present in one of the following ranges: from -10 to 10; -10 to less than 10; -10 to 9; -10 to 8; -10 to 7; -10 to 6; -10 to 5; -10 to 4; -10 to 3; -10 to 2; from -5 to 9; -5 to 8; -5 to 7; -5 to 6; -5 to 5; -5 to 4; -5 to 3; -5 to 2; 0 to 9; 0 to 8; 0 to 7; 0 to 6; 0 to 5; 0 to 4; 0 to 3; 0 to 2; 1 to 10; 1 to 9; 1 to 8; 1 to 7; 1 to 6; 1 to 5; 1 to 4; 1 to 3; and 1 to 2. In other embodiments, the L* value for the polyesters useful in the invention can be present in one of the following ranges: 80 to 98; 85 to 98; 90 to 98; greater than 90 to 98; 91 to 98; 92 to 98; 93 to 98; 94 to 98; 95 to 98; 91 to 97; 92 to 97; 93 to 97; 94 to 97; 95 to 97; 91 to 96; 92 to 96; 93 to 96; or 94 to 96, where the measurements were performed on polymer granules ground to pass a 1 mm sieve.

Notched Izod impact strength, as described in ASTM D256, is a common method of measuring toughness. Notched Izod impact strength is measured herein at 23° C. with a 10-mil notch in a 3.2 mm (⅛-inch) thick bar determined according to ASTM D256. In one embodiment, certain polyesters useful in the invention can exhibit a notched Izod impact strength of at least 25 J/m (0.47 ft-lb/in) at 23° C. with a 10-mil notch in a 3.2 mm (⅛-inch) thick bar determined according to ASTM D256. In one embodiment, certain polyesters useful in the invention can exhibit a notched Izod impact strength of from about 25 J/m (0.47 ft-lb/in) to about 75 J/m (1.41 ft-lb/in) at 23° C. with a 10-mil notch in a 3.2 mm (⅛-inch) thick bar determined according to ASTM D256. In another embodiment, certain polyesters useful in the invention can exhibit a notched Izod impact strength of from about 50 J/m (0.94 ft-lb/in) to about 75 J/m (1.41 ft-lb/in) at 23° C. with a 10-mil notch in a 3.2 mm (⅛-inch) thick bar determined according to ASTM D256.

In one embodiment, certain polyesters useful in the invention can exhibit at least one of the following densities: a density of greater than 1.2 g/ml at 23° C.

In one embodiment, certain polyesters useful in the invention can exhibit a flexural modulus at 23° C. equal to or greater than 2000 MPa (290,000 psi) as defined by ASTM D790. In another embodiment, certain polyesters useful in the invention can exhibit a flexural modulus at 23° C. from about 2000 MPa (290,000 psi) to about 2551 MPa (370,000 psi) as defined by ASTM D790. In another embodiment, certain polyesters useful in the invention can exhibit a flexural modulus at 23° C. from about 2000 MPa (290,000 psi) to about 2413 MPa (350,000 psi) as defined by ASTM D790.

Certain polyesters useful in the invention can possess at least one of the following properties: a Tg of from about 85 to about 100° C. as measured by a TA 2100 Thermal Analyst Instrument at a scan rate of 20° C./min; a flexural modulus at 23° C. equal to or greater than 2000 MPa (290,000 psi) as defined by ASTM D790; and a notched Izod impact strength equal to or greater than 25 J/m (0.47 ft-lb/in) according to ASTM D256 with a 10-mil notch using a ⅛-inch thick bar at 23° C.

In one embodiment, the melt viscosity of the polyester(s) useful in the invention can be less than 30,000 poise as measured a 1 radian/second on a rotary melt rheometer at 290° C. In another embodiment, the melt viscosity of the polyester(s) useful in the invention can be less than 20,000 poise as measured a 1 radian/second on a rotary melt rheometer at 290° C.

In one embodiment, the melt viscosity of the polyester(s) useful in the invention can be less than 15,000 poise as measured at 1 radian/second (rad/sec) on a rotary melt rheometer at 290° C. In one embodiment, the melt viscosity of the polyester(s) useful in the invention can be less than 12,000 poise as measured at 1 radian/second (rad/sec) on a rotary melt rheometer at 290° C. In one embodiment, the melt viscosity of the polyester(s) useful in the invention in can be less than 10,000 poise as measured at 1 radian/second (rad/sec) on a rotary melt rheometer at 290° C.

In some embodiments, use of the polyester compositions useful in the invention minimizes and/or eliminates the drying step prior to melt processing and/or thermoforming.

In one embodiment, the present invention comprises a thermoplastic article, typically in the form of sheet material, having a decorative material embedded therein which comprise any of the compositions described herein.

In one embodiment, the polyesters according to the invention can be used for appliance parts. "Appliance parts," as used herein, refers to a rigid piece used in conjunction with an appliance. In one embodiment, the appliance part is partly or wholly separable from the appliance. In another embodiment, the appliance part is one that is typically made from a polymer. In one embodiment, the appliance part is visually clear.

In one embodiment, the polyesters according to the invention can be used for bottles and containers including those that are injection molded, injection blow molded, injection stretch blowmolded, blow molded, or reheat blow-molded. Articles made by these methods include dual wall tumblers, sports bottles, bulk water containers, and baby bottles.

The following examples further illustrate how the polyesters of the invention can be made and evaluated, and are intended to be purely exemplary of the invention and are not intended to limit the scope thereof. Unless indicated otherwise, parts are parts by weight, temperature is in degrees C. or is at room temperature, and pressure is at or near atmospheric.

EXAMPLES

The following examples illustrate in general how copolyesters of this invention can be prepared and the effect of using 2,2,4,4-tetramethyl-1,3-cyclobutanediol and ethylene glycol, and certain catalyst and stabilizers, on various copolyester properties such as color, IV and dish washer durability.

Measurement Methods

The inherent viscosity of the polyesters was determined in 60/40 (wt/wt) phenol/tetrachloroethane at a concentration of 0.5 g/100 ml at 25° C., and is reported in dL/g.

The glycol content and the cis/trans ratio of the compositions were determined by proton nuclear magnetic resonance (NMR) spectroscopy. All NMR spectra were recorded on a JEOL Eclipse Plus 600 MHz nuclear magnetic resonance spectrometer using either chloroform-trifluoroacetic acid (70-30 volume/volume) for polymers or, for oligomeric samples, 60/40 (wt/wt) phenol/tetrachloroethane with deuterated chloroform added for lock. Peak assignments for 2,2,4,4-tetramethyl-1,3-cyclobutanediol resonances were made by comparison to model mono- and dibenzoate esters of 2,2,4,4-tetramethyl-1,3-cyclobutanediol. These model compounds closely approximate the resonance positions found in the polymers and oligomers.

Color values reported herein are CIELAB L*, a*, and b* values measured following ASTM D 6290-98 and ASTM E308-99, using measurements from a Hunter Lab Ultrascan XE Spectrophotometer (Hunter Associates Laboratory Inc., Reston, Va.) with the following parameters: (1) D65 illuminant, (2) 10 degree observer, (3) reflectance mode with specular angle included, (4) large area view, (5) 1" port size. Unless stated otherwise, the measurements were performed on polymer granules ground to pass a 1 mm sieve.

The amount of fin (Sn), titanium (Ti) and manganese (Mn) in the examples below is reported in parts per million (ppm) of metal and was measured by x-ray fluorescence (xrf) using a PANanalytical Axios Advanced wavelength dispersive x-ray fluorescence spectrometer. The amount of phosphorous is similarly reported as ppm of elemental phosphorus and was also measured by xrf using the same instrument. The values reported in the column "P measured" in the following examples were obtained by measuring phosphorous as described above.

Unless otherwise specified, the cis/trans ratio of the 2,2,4,4-tetramethyl-1,3-cyclobutanediol used in the following examples was approximately 50/50 and could range from 45/55 to 55/45.

The dimethyl terephthalate (DMT) was purchased from Cape Industries, the ethylene glycol (EG), and the 2,2,4,4-tetramethyl-1,3-cyclobutanediol (TMCD) were from Eastman Chemical Company. The tin compound was butyltin tris (2-ethylhexanoate) purchased from Aldrich. The titanium compound was titanium (IV) isopropoxide purchased from Aldrich. The phosphorus compound was Merpol A from Stepan Co. Unless otherwise indicated below, the source of phosphorous was added upfront, with the rest of the polyester reagents. A solution was made with titanium isopropoxide and EG to facilitate the addition of Ti catalyst. The concentration of the Ti catalyst solution was 0.92 wt atomic Ti/vol %. A solution was made with butyltin tris(2-ethylhexanoate) and n-butanol to facilitate the addition of Sn catalyst. The concentration of the Sn catalyst solution was 1.57 atomic Sn/vol %. A solution was made with Merpol A and EG to facilitate the addition of phosphorus stabilizer. The concentration of the P stabilizer solution was 0.22 atomic P/vol %.

Example 1a (Sn and Ti)

A mixture of 77.68 g (0.4 mol) of DMT, 42.51 g (0.68 mol) of EG, and 16.61 g (0.12 mol) of TMCD, was placed in a 500-milliliter flask equipped with an inlet for nitrogen, a metal stirrer, and a short distillation column. In addition, 0.22 ml of the Ti catalyst solution (targeting 25 ppm Ti), 0.08 ml of the Sn catalyst solution (targeting 15 ppm Sn), and 1.51 ml of the P stabilizer solution (targeting 40 ppm P) were added to the flask. The flask was placed in a Wood's metal bath already heated to 200° C. The stirring speed was set to 200 RPM at the beginning of the experiment. The contents of the flask were heated at 200° C. for 5 minutes and then the temperature was gradually increased to 275° C. over 240 minutes. The reaction mixture was then held at 275° C. for 20 minutes as the stirrer was slowed down to 100 rpm and a vacuum was gradually applied to 0.3 torr. The temperature of 275° C., vacuum of 0.3 torr, and stirring at 100 rpm was maintained for a total time of 100 minutes to remove excess unreacted diols. After 100 minutes, the run was complete and the polymer was allowed to cool and later removed from the reaction flask. The polymer was ground to 1 mm. The actual catalyst amounts were determined and shown in Table 1. The mol % TMCD in the polymer and b* of the ground polymer is shown in Table 2. The % TMCD incorporation reported in Table 2 was determined by taking the mol % TMCD in the polymer divided by the (mol of TMCD charged/DMT charged). For example 1a that would be 16.9/(0.12/0.40) resulting in 58.6%. The resulting polymer IV is also reported in Table 2.

Example 1b (Ti Only)

A mixture of 77.68 g (0.4 mol) of DMT, 42.51 g (0.68 mol) of EG, and 16.61 g (0.12 mol) of TMCD, was placed in a 500-milliliter flask equipped with an inlet for nitrogen, a metal stirrer, and a short distillation column. In addition, 0.29 ml of the Ti catalyst solution (targeting 32 ppm Ti) and 1.51 ml of the P stabilizer solution (targeting 40 ppm P) were added to the flask. The choice of 32 ppm Ti was to give the equivalent molar concentration of the total catalyst used in experiment 1a. The flask was placed in a Wood's metal bath already heated to 200° C. The stirring speed was set to 200 RPM at the beginning of the experiment. The contents of the flask were heated at 200° C. for 5 minutes and then the temperature was gradually increased to 275° C. over 240 minutes. The reaction mixture was then held at 275° C. for 20 minutes as the stirrer was slowed down to 100 rpm and a vacuum was gradually applied to 0.3 torr. The temperature of 275° C., vacuum of 0.3 torr, and stirring at 100 rpm was maintained for a total time of 100 minutes to remove excess unreacted diols. After 100 minutes, the run was complete and the polymer was allowed to cool and later removed from the reaction flask. The polymer was ground to 1 mm. The actual catalyst amounts were determined and shown in Table 1. The mol % TMCD in the polymer and b* of the ground polymer is shown in Table 2. The % TMCD incorporation reported in Table 2 was determined by taking the mol % TMCD in the polymer divided by the (mol of TMCD charged/DMT charged). The resulting polymer IV is also reported in Table 2.

Example 1c (Sn Only)

A mixture of 77.68 g (0.4 mol) of DMT, 42.51 g (0.68 mol) of EG, and 16.61 g (0.12 mol) of TMCD, was placed in a 500-milliliter flask equipped with an inlet for nitrogen, a metal stirrer, and a short distillation column. In addition, 0.41 ml of the Sn catalyst solution (targeting 77 ppm Sn), and 1.51 ml of the P stabilizer solution (targeting 40 ppm P) were added to the flask. The choice of 77 ppm Sn was to give the equivalent molar concentration of the total catalyst used in experiment 1a. The flask was placed in a Wood's metal bath already heated to 200° C. The stirring speed was set to 200 RPM at the beginning of the experiment. The contents of the flask were heated at 200° C. for 5 minutes and then the temperature was gradually increased to 275° C. over 240 minutes. The reaction mixture was then held at 275° C. for 20 minutes as the stirrer was slowed down to 100 rpm and a vacuum was gradually applied to 0.3 torr. The temperature of 275° C., vacuum of 0.3 torr, and stirring at 100 rpm was maintained for a total time of 100 minutes to remove excess unreacted diols. After 100 minutes, the run was complete and the polymer was allowed to cool and later removed from the reaction flask. The polymer was ground to 1 mm. The actual catalyst amounts were determined and shown in Table 1. The mol % TMCD in the polymer and b* of the ground polymer is shown in Table 2. The % TMCD incorporation reported in Table 2 was determined by taking the mol % TMCD in the polymer divided by the (mol of TMCD charged/DMT charged). The resulting polymer IV is also reported in Table 2.

Example 2a (Sn and Ti)

A mixture of 77.68 g (0.4 mol) of DMT, 38.53 g (0.62 mol) of EG, and 25.84 g (0.18 mol) of TMCD, was placed in a 500-milliliter flask equipped with an inlet for nitrogen, a metal stirrer, and a short distillation column. In addition, 0.23 ml of the Ti catalyst solution (targeting 25 ppm Ti), 0.08 ml of the Sn catalyst solution (targeting 15 ppm Sn), and 1.56 ml of the P stabilizer solution (targeting 40 ppm P) were added to the flask. The flask was placed in a Wood's metal bath already heated to 200° C. The stirring speed was set to 200 RPM at the beginning of the experiment. The contents of the flask were heated at 200° C. for 5 minutes and then the temperature was gradually increased to 275° C. over 240 minutes. The reaction mixture was then held at 275° C. for 20 minutes as the stirrer was slowed down to 100 rpm and a vacuum was gradually applied to 0.3 torr. The temperature of 275° C., vacuum of 0.3 torr, and stirring at 100 rpm was maintained for a total time of 100 minutes to remove excess unreacted diols. After 100 minutes, the run was complete and the polymer was allowed to cool and later removed from the reaction flask. The polymer was ground to 1 mm. The actual catalyst amounts were determined and shown in Table 1. The mol % TMCD in the polymer and b* of the ground polymer is shown in Table 2. The % TMCD incorporation reported in Table 2 was determined by taking the mol % TMCD in the polymer divided by the (mol of TMCD charged/DMT charged). For example 2a that would be 27.2/(0.18/0.40) resulting in 60.6%. The resulting polymer IV is also reported in Table 2.

Example 2b (Ti Only)

A mixture of 77.68 g (0.4 mol) of DMT, 38.53 g (0.62 mol) of EG, and 25.84 g (0.18 mol) of TMCD, was placed in a 500-milliliter flask equipped with an inlet for nitrogen, a metal stirrer, and a short distillation column. In addition, 0.30 ml of the Ti catalyst solution (targeting 32 ppm Ti) and 1.56 ml of the P stabilizer solution (targeting 40 ppm P) were added to the flask. The choice of 32 ppm Ti was to give the equivalent molar concentration of the total catalyst used in experiment 2a. The flask was placed in a Wood's metal bath already heated to 200° C. The stirring speed was set to 200 RPM at the beginning of the experiment. The contents of the flask were heated at 200° C. for 5 minutes and then the temperature was gradually increased to 275° C. over 240 minutes. The reaction mixture was then held at 275° C. for 20 minutes as the stirrer was slowed down to 100 rpm and a vacuum was gradually applied to 0.3 torr. The temperature of 275° C., vacuum of 0.3 torr, and stirring at 100 rpm was maintained for a total time of 100 minutes to remove excess unreacted diols. After 100 minutes, the run was complete and the polymer was allowed to cool and later removed from the reaction flask. The polymer was ground to 1 mm. The actual catalyst amounts were determined and shown in Table 1. The mol % TMCD in the polymer and b* of the ground polymer is shown in Table 2. The % TMCD incorporation reported in Table 2 was determined by taking the mol % TMCD in the polymer divided by the (mol of TMCD charged/DMT charged). The resulting polymer IV is also reported in Table 2.

Example 2c (Sn Only)

A mixture of 77.68 g (0.4 mol) of DMT, 38.83 g (0.62 mol) of EG, and 25.84 g (0.18 mol) of TMCD, was placed in a 500-milliliter flask equipped with an inlet for nitrogen, a metal stirrer, and a short distillation column. In addition, 0.42 ml of the Sn catalyst solution (targeting 77 ppm Sn), and 1.56 ml of the P stabilizer solution (targeting 40 ppm P) were added to the flask. The choice of 77 ppm Sn was to give the equivalent molar concentration of the total catalyst used in experiment 2a. The flask was placed in a Wood's metal bath already heated to 200° C. The stirring speed was set to 200 RPM at the beginning of the experiment. The contents of the flask were heated at 200° C. for 5 minutes and then the temperature was gradually increased to 275° C. over 240 minutes. The reaction mixture was then held at 275° C. for 20 minutes as the stirrer was slowed down to 100 rpm and a vacuum was gradually applied to 0.3 torr. The temperature of 275° C., vacuum of 0.3 torr, and stirring at 100 rpm was maintained for a total time of 100 minutes to remove excess unreacted diols. After 100 minutes, the run was complete and the polymer was allowed to cool and later removed from the reaction flask. The polymer was ground to 1 mm. The actual catalyst amounts were determined and shown in Table 1. The mol % TMCD in the polymer and b* of the ground polymer is shown in Table 2. The % TMCD incorporation reported in Table 2 was determined by taking the mol % TMCD in the polymer divided by the (mol of TMCD charged/DMT charged). The resulting polymer IV is also reported in Table 2.

Example 3a (Sn and Ti)

A mixture of 77.68 g (0.4 mol) of DMT, 34.56 g (0.56 mol) of EG, and 35.07 g (0.24 mol) of TMCD, was placed in a 500-milliliter flask equipped with an inlet for nitrogen, a metal stirrer, and a short distillation column. In addition, 0.24 ml of the Ti catalyst solution (targeting 25 ppm Ti), 0.09 ml of the Sn catalyst solution (targeting 15 ppm Sn), and 1.62 ml of the P stabilizer solution (targeting 40 ppm P) were added to the flask. The flask was placed in a Wood's metal bath already heated to 200° C. The stirring speed was set to 200 RPM at the beginning of the experiment. The contents of the flask were heated at 200° C. for 5 minutes and then the temperature was gradually increased to 275° C. over 240 minutes. The reaction mixture was then held at 275° C. for 20 minutes as the stirrer was slowed down to 100 rpm and a vacuum was gradually applied to 0.3 torr. The temperature of 275° C., vacuum of 0.3 torr, and stirring at 100 rpm was maintained for a total time of 100 minutes to remove excess unreacted diols. After 100 minutes, the run was complete and the polymer was allowed to cool and later removed from the reaction flask. The polymer was ground to 1 mm. The actual catalyst amounts were determined and shown in Table 1. The mol % TMCD in the polymer and b* of the ground polymer is shown in Table 2. The % TMCD incorporation reported in Table 2 was determined by taking the mol % TMCD in the polymer divided by the (mol of TMCD charged/DMT charged). For example 3a that would be 36.8/(0.24/0.40) resulting in 60.6%. The resulting polymer IV is also reported in Table 2.

Example 3b (Ti Only)

A mixture of 77.68 g (0.4 mol) of DMT, 34.56 g (0.58 mol) of EG, and 35.07 g (0.24 mol) of TMCD, was placed in a 500-milliliter flask equipped with an inlet for nitrogen, a metal stirrer, and a short distillation column. In addition, 0.31 ml of the Ti catalyst solution (targeting 32 ppm Ti) and 1.62 ml of the P stabilizer solution (targeting 40 ppm P) were added to the flask. The choice of 32 ppm Ti was to give the equivalent molar concentration of the total catalyst used in experiment 3a. The flask was placed in a Wood's metal bath already heated to 200° C. The stirring speed was set to 200 RPM at the beginning of the experiment. The contents of the flask were heated at 200° C. for 5 minutes and then the temperature was gradually increased to 275° C. over 240 minutes. The reaction mixture was then held at 275° C. for 20 minutes as the stirrer was slowed down to 100 rpm and a vacuum was gradually applied to 0.3 torr. The temperature of 275° C., vacuum of 0.3 torr, and stirring at 100 rpm was maintained for a total time of 100 minutes to remove excess unreacted diols. After 100 minutes, the run was complete and the polymer was allowed to cool and later removed from the reaction flask. The polymer was ground to 1 mm. The actual catalyst amounts were determined and shown in Table 1. The mol % TMCD in the polymer and b* of the ground polymer is shown in Table 2. The % TMCD incorporation reported in Table 2 was determined by taking the mol % TMCD in the polymer divided by the (mol of TMCD charged/DMT charged). The resulting polymer IV is also reported in Table 2.

Example 3c (Sn Only)

A mixture of 77.68 g (0.4 mol) of DMT, 34.56 g (0.56 mol) of EG, and 35.07 g (0.24 mol) of TMCD, was placed in a 500-milliliter flask equipped with an inlet for nitrogen, a metal stirrer, and a short distillation column. In addition, 0.44 ml of the Sn catalyst solution (targeting 77 ppm Sn), and 1.62 ml of the P stabilizer solution (targeting 40 ppm P) were added to the flask. The choice of 77 ppm Sn was to give the equivalent molar concentration of the total catalyst used in experiment 3a. The flask was placed in a Wood's metal bath already heated to 200° C. The stirring speed was set to 200 RPM at the beginning of the experiment. The contents of the flask were heated at 200° C. for 5 minutes and then the temperature was gradually increased to 275° C. over 240 minutes. The reaction mixture was then held at 275° C. for 20 minutes as the stirrer was slowed down to 100 rpm and a vacuum was gradually applied to 0.3 torr. The temperature of 275° C., vacuum of 0.3 torr, and stirring at 100 rpm was maintained for a total time of 100 minutes to remove excess unreacted diols. After 100 minutes, the run was complete and the polymer was allowed to cool and later removed from the reaction flask. The polymer was ground to 1 mm. The actual catalyst amounts were determined and shown in Table 1. The mol % TMCD in the polymer and b* of the ground polymer is shown in Table 2. The % TMCD incorporation reported in Table 2 was determined by taking the mol % TMCD in the polymer divided by the (mol of TMCD charged/DMT charged). The resulting polymer IV is also reported in Table 2.

| Ex. | Catalyst Metals | DMT (mol) | TMCD (mol) | EG (mol) | Ti (ppm) | Sn (ppm) | P (ppm) | Total Sn + Ti (□ mol/g) | P (□ mol/g) |
|---|---|---|---|---|---|---|---|---|---|
| 1a | Sn and Ti | 0.40 | 0.12 | 0.69 | 26 | 19 | 30 | 0.69 | 0.96 |
| 1b | Ti | 0.40 | 0.12 | 0.69 | 32 | 0 | 31 | 0.67 | 1.01 |
| 1c | Sn | 0.40 | 0.12 | 0.69 | 0 | 77 | 36 | 0.66 | 1.16 |
| 2a | Sn and Ti | 0.40 | 0.18 | 0.62 | 26 | 18 | 33 | 0.70 | 1.05 |
| 2b | Ti | 0.40 | 0.18 | 0.62 | 33 | 0 | 33 | 0.69 | 1.08 |
| 2c | Sn | 0.40 | 0.18 | 0.62 | 0 | 78 | 40 | 0.66 | 1.28 |
| 3a | Sn and Ti | 0.40 | 0.24 | 0.56 | 27 | 16 | 37 | 0.70 | 1.20 |
| 3b | Ti | 0.40 | 0.24 | 0.56 | 33 | 0 | 38 | 0.70 | 1.23 |
| 3c | Sn | 0.40 | 0.24 | 0.56 | 0 | 79 | 41 | 0.66 | 1.32 |

| Ex. | Catalyst Metals | TMCD in polymer (mol %) | TMCD Incorporation (mol %) | b* | IV (dL/g) |
|---|---|---|---|---|---|
| 1a | Sn and Ti | 16.9 | 58.6 | 9.0 | 0.83 |
| 1b | Ti | 16.5 | 57.3 | 4.8 | 0.76 |
| 1c | Sn | 13.3 | 46.3 | 19.3 | 0.71 |
| 2a | Sn and Ti | 27.1 | 60.6 | 6.7 | 0.77 |
| 2b | Ti | 25.0 | 55.9 | 4.4 | 0.73 |
| 2c | Sn | 27.2 | 60.8 | 14.2 | 0.66 |
| 3a | Sn and Ti | 36.8 | 60.6 | 5.2 | 0.67 |
| 3b | Ti | 26.5 | 43.6 | 3.7 | 0.66 |
| 3c | Sn | 38.1 | 62.7 | 10.1 | 0.62 |

A review of the examples and tables reveals that Example 1 represents attempts to make a material containing low amounts of TMCD (~15 mol % TMCD), Example 2 represents attempts to make a material containing medium amounts of TMCD (~26 mol % TMCD), and Example 3 represents attempts to make materials containing higher amounts of TMCD (~37 mol % TMCD).

It is desireable to have a catalyst system that can produce polyester with high TMCD incorporation (preferably greater than 50%), b* values as low as possible (at least less than 10), and the ability to achieve an IV in a reasonable time frame over the compositional range. A review of tables 1 and 2 reveals that Ti alone with P is useful to prepare materials with TMCD levels of 25 mol % (example 2b) and 26.5 mol % (example 3b). Sn alone with P cannot be used to prepare any useful materials due to b* value exceeding 10 (example 1c, 2c, 3c). In all cases, the Ti and P catalyst achieved the lowest b* values.

Example 4 (Ti/Mn/P)

This example illustrates the preparation of a copolyester with a target composition of 100 mole % dimethyl terephthalate residues, 78 mole % ethylene glycol residues and 22 mole % 2,2,4,4-tetramethyl-1,3-cyclobutanediol residues.

A mixture of 0.40 moles of dimethylterephthalate, 0.432 moles of ethylene glycol, 0.128 moles of 2,2,4,4-tetramethyl-1,3-cyclobutanediol, 0.79 grams of manganese(II) diacetate and 1.26 grams of titanium(IV) tetraisopropoxide was charged to a 500 milliliter round bottom flask and equipped with a nitrogen inlet, metal stirrer, a rubber stopper and a short distillation column interfaced to a vacuum system. The flask was then submerged in a Belmont bath preheated to 200° C. The stirring speed was set to 200 RPM at the beginning of the experiment. After all reagents had melted, the reaction temperature was slowly increased over 3 hours to 275° C. Once a temperature of 275° C. was achieved, 7.89 grams of Merpol A was added to the reaction mixture and vacuum was gradually applied over 20 minutes to 0.3 torr with stirring speed decreased to 100 RPM. This target vacuum was maintained for 125 minutes, during which a viscous, clear and slightly yellow polymer with afforded with an inherent viscosity of 0.64 dL/g. 1H NMR analysis revealed that the copolyester was composed of 25.23 mole % 2,2,4,4-tetramethyl-1,3-cyclobutanediol, 0.66 mole % diethylene glycol and 74.11 mole % ethylene glycol.

The above example was repeated with varying reaction conditions. The results are shown below in Table 3, which lists EG charges (moles), TMCD charges (moles), polycondensation temperature (C), polycondensation reaction time (min), inherent viscosity (dl/g), dimethylterephthalate (DMT) polymer content (mole %), ethylene glycol (EG) polymer content (mole %), 2,2,4,4-tetramethyl-1,3-cyclobutanediol (TMCD) polymer content (mole %), diethylene glycol (DEG) content (mole %), Mn concentration (ppm), Ti concentration (ppm), P concentration (ppm), L*, a* and b* values.

TABLE 3

Polyesters made from TMCD and EG using Ti/Mn/P.

| EG | TMCD | Polycon Temp | Polycon Time (min) | IhV | DMT | EG | TMCD | DEG | Mn | Ti | P | L* | a* | b* |
|---|---|---|---|---|---|---|---|---|---|---|---|---|---|---|
| 0.432 | 0.128 | 275 | 125 | 0.667 | 100 | 74.10 | 25.25 | 0.67 | 54.2 | 47.3543 | 18.8 | 93.17 | −1.79 | 10.35 |
| 0.432 | 0.128 | 275 | 125 | 0.656 | 100 | 74.04 | 25.27 | 0.69 | 54.5 | 30.943 | 36.2 | 92.6 | −1.46 | 7.63 |
| 0.432 | 0.128 | 275 | 125 | 0.602 | 100 | 74.18 | 25.16 | 0.66 | 54.5 | 29.519 | 51.7 | 92.3 | −1.4 | 7.4 |
| 0.432 | 0.128 | 275 | 125 | 0.64 | 100 | 74.11 | 25.23 | 0.66 | 27.6 | 29.464 | 42.6 | 93.92 | −1.37 | 7.02 |
| 0.432 | 0.128 | 265 | 180 | 0.538 | 100 | 74.12 | 25.48 | 0.40 | 28.9 | 26.908 | 41 | 93.26 | −0.76 | 4.68 |
| 0.432 | 0.128 | 265 | 180 | 0.471 | 100 | 76.75 | 22.91 | 0.34 | 17.4 | 15.444 | 25.5 | 95.24 | −0.78 | 3.41 |
| 0.432 | 0.128 | 265 | 180 | 0.584 | 100 | 76.20 | 23.48 | 0.32 | 11.6 | 21.944 | 28.3 | 94.58 | −0.7 | 4.09 |
| 0.432 | 0.128 | 260 | 210 | 0.586 | 100 | 74.25 | 25.39 | 0.36 | 29.4 | 26.143 | 24.6 | 95.03 | −0.75 | 4.98 |

Example 5 (Larger Batch Polymer Process)

Copolyesters based on 2,2,4,4-tetramethyl-1,3-cyclobutanediol (TMCD) and EG were prepared as described below. Examples were prepared using a 100 lb batch reactor, similar to Example 2b above (for Ti and P process) and similar to Example 4 above (for Ti, Mg and P process), where DMT, EG, TMCD, catalyst and P were added to the reactor and the temperature was ramped to 275° C. over a period of 6 hours with agitation at 15 rpm. When the polymer temperature reached 275° C., full vacuum was applied. When the pressure reached <2 mm Hg, the polymer was exuded from the reactor and pelletized into product.

Several batches were made using a Ti and P process, resulting in polymers having TMCD in an amount ranging from 20.56 to 26.3 mole %, based on the diol content, IV ranging from 0.579 to 0.74 dl/g, Ti ranging from about 50 to about 60 ppm, and P ranging from about 70 to about 80 ppm.

Example 5a was prepared by blending different (Ti and P) batches of polymers having TMCD in an amount ranging from 23.99 to 26.03 mole %, based on the diol content, and IV ranging from 0.579 to 0.597 dl/g to provide a polymer blend having an average TMCD content of 25.3 mole % TMCD, a Tg of 95.6° C., and IV of 0.59 dl/g, residual Ti of about 50 ppm and residual P of about 70 ppm.

Example 5b was prepared by blending different (Ti and P) batches of polymers having TMCD in an amount ranging from 20.56 to 26.3 mole %, based on the diol content, and IV ranging from 0.594 to 0.74 dl/g to provide a polymer blend having an average TMCD content of 23.4 mole %

TMCD, a Tg of 93.1° C., and IV of 0.66 dl/g, residual Ti of about 50 ppm and residual P of about 70 ppm.

Several batches were made using a Ti and P process, resulting in polymers having TMCD in an amount ranging from 32.66 to 37.72 mole %, based on the diol content, IV ranging from 0.563 to 0.651 dl/g, Ti ranging from about 50 to about 60 ppm, and P ranging from about 70 to about 80 ppm.

Example 5c was prepared by blending the different (Ti, Mg and P) batches of polymers to provide a polymer blend having an average TMCD content of 36.4 mole % TMCD, a Tg of 106.5° C., and IV of 0.59 dl/g, residual Ti of about 50 ppm and residual P of about 70 ppm.

Example 6 (Dishwasher Durability Testing)

Polymer according to Example 5a was formed into cups and subjected to dishwasher durability testing by comparing it to other commercially available polymers. Thick and thin walled beverageware (cups) made of Example 5a, Tritan® Copolyester TX1000 (from Eastman Chemical Company), PETG (GN071 from Eastman Chemical Company) and SAN (LUSTRAN SAN 31 from Ineos) were evaluated for their appearance during and after 50 cycles of residential dishwashing. Optical changes in appearance and dimensions were observed as well as volumetric changes.

A Kenmore residential dishwasher, model 665, serial Nr. 15769000 was utilized for 50 cycle dishwashing studies on Example 5a polymer in comparison to the Tritan TX1000 Copolyester, PETG and SAN (LUSTRAN SAN 31) polymers. Dishwashing detergent was "Cascade Powder", the setting was pots and pans with a heated dry.

An outer shell of a dual wall tumbler was utilized as a thin walled part. The thick walled part was represented by a beer mug.

Samples were placed in five different positions in the top and the bottom rack, where each rack was divided into a 3×3 matrix of separate areas when looking down on the rack. The five positions used were as follows:
BL=Back Left position (extreme back and left corner area of the 3×3 matrix)
BR=Back Right position (extreme back and right corner area of the 3×3 matrix)
C=Center position (center area of the 3×3 matrix)
FL=Front Left position (extreme front and left corner area of the 3×3 matrix)
FR=Front Right position (extreme front and right corner area of the 3×3 matrix)

The temperatures in the dishwasher were measured with thermocouples in each of the different positions on the top rack as well as the bottom rack. The temperature on the bottom rack during the drying cycle reached maximum temperatures within the following ranges: C from 50 to 60° C.; FR from 60 to 70° C.; and FL, BL and BR from 80 to 90° C. The temperature on the top rack during the drying cycle reached maximum temperatures within the following ranges: C and FR from 5 to 62° C.; and FL, BL and BR from 60 to 70° C. Overall, the bottom rack was much more severe than on the top rack with the highest temperature noted at the back right position with 89.1° C.

The samples were visually checked for shrinkage, deformation and other conspicuities after every cycle during the first 10 cycles, then after cycles 15, 20, 30, 40 and 50. Volumetric measurements were performed with shrunken and deformed samples after cycle 50. With the samples on a scale, a metal plate with a slightly tapered opening in the middle was placed on top of the samples while the cup was filled with water through the opening. The weight of water was noted once the water surface first touched the metal rim and compared to the weight that was measured for a virgin cup. The weight of the water was taken as the final volume of the sample based on the density of water being 1 g/cm$^3$. The results of the thin walled beverage ware testing are shown below in Table 4.

TABLE 4

Volumetric measurement data of thin walled beverageware after 50 cycles in a residential dishwasher

| | Position | Ex 5a | TX1001 | SAN | PETG |
|---|---|---|---|---|---|
| 0 dishwasher cycles | control | 457 | 458 | 458.9 | 459.3 |
| residential bottom tray | BFR | 451.2 | 457.1 | 458.9 | 444.3 |
| | BFL | 448.1 | 459.1 | 461.6 | too deformed |
| | BC | 460.1 | 458.9 | 459.5 | 447.9 |
| | BBR | 452 | 457.6 | 459.3 | 445 |
| | BBL | 451 | 458.2 | 459.8 | 448.3 |
| | Average | 452.48 | 458.18 | 459.82 | 446.375 |
| | Stdev.S | 4.51 | 0.85 | 1.05 | 2.02 |
| | difference to ctrl [%] | 0.99 | −0.04 | −0.20 | 2.81 |
| residential top tray | TFR | 458.5 | 460.1 | 460 | 453.3 |
| | TFL | 458 | 459.4 | 458.2 | 449.4 |
| | TC | 458.3 | | | |
| | TBR | 458.6 | 457.3 | 459.5 | 449.7 |
| | TBL | 455 | 458.6 | 458.6 | 451 |
| | Average | 457.68 | 458.85 | 459.075 | 450.85 |
| | Stdev. S | 1.52 | 1.20 | 0.82 | 1.77 |
| | difference to ctrl [%] | −0.15 | −0.19 | −0.04 | 1.84 |

A review of Table 4 reveals that the thin walled beverage ware testing was as follows: PETG samples changed severely in the bottom rack from cycle 1 and in the top rack after cycle 8. Shrinkage in height and diameter as well as general shape deformation was observed. After 50 cycles the PETG samples in the bottom tray were very deformed, with one deformed too much to make a volumetric measurement. For the remaining samples a volumetric loss of about 2.8% was determined. In the top tray the deformations and shrinkages were less severe with about 1.84% change during volumetric measurements.

Example 5a samples started to very slightly deform (one sample only) and shrink in the bottom rack as of cycle 7. After the experiment a volumetric change of 1% was determined, mainly due to shrinkage. The samples on the top tray did not show shrinkage or deformation.

Tritan TX1000 copolymer and SAN did not show shrinkage or deformations. However, they showed more scratches in the bottom rack than PETG or Example 5a.

The results of the thick walled beverage ware for the bottom rack for Example 5a and PETG are shown below in Table 5.

TABLE 5

Volumetric measurement data of thick walled beverageware after 50 cycles in a residential dishwasher

| | Position | Ex 5a | PETG |
|---|---|---|---|
| 0 dishwasher cycles | control | 474.9 | 475.4 |
| residential bottom tray | BFR | 470.06 | 461 |
| | BFL | 467.3 | 456.5 |
| | BC | 471.5 | 463.5 |
| | BBR | 468.8 | 455 |
| | BBL | 469.5 | 460.35 |
| | Average | 469.432 | 459.27 |

TABLE 5-continued

Volumetric measurement data of thick walled beverageware after 50 cycles in a residential dishwasher

| Position | Ex 5a | PETG |
|---|---|---|
| Stdev. S | 1.55 | 3.46 |
| difference to ctrl [%] | 1.15 | 3.39 |

Generally, the thick walled beverageware was more prone to marks where the heavier parts rested on the trays as the thin walled beverageware which did not show that phenomena.

PETG showed those marks after the third cycle in the bottom rack and after the 4th cycle the first shrinkage was noted, also on the bottom rack, proceeding throughout the experiment with more shrinkage and deformation. After cycle 6 the first marking was noted on the top rack. By the end of the experiment, all samples showed marks and shrinkage and some showed deformation. A review of Table 5 reveals that volumetric measurement for thick walled PETG showed 3.4% change after 50 cycles on the bottom tray.

Thick walled Example 5a showed first signs of shrinkage on some samples in the bottom tray after 15 cycles and first marks after cycle 20. On the top rack no changes were observed throughout the experiment. Also, the center positioned sample on the bottom tray did not show noticeable changes. A review of Table 5 reveals that the overall volumetric change of the Example 5a thick walled samples in the bottom tray was 1.2%. Tritan and SAN did not show dimensional changes after 50 cycles.

Overall, the thin walled Example 5a, TX1000 and SAN parts did not change dimensions in the upper rack during 50 cycles, while PETG showed initial changes during the first 10 cycles. Volumetric measurements of thin walled parts after 50 cycles on the top rack showed no changes for Example 5a, TX1000 and SAN and 1.8% change for PETG. On the bottom dishwasher rack deformations of the PETG samples were severe and started with the first cycle, whilst Example 5a showed overall only a small shrinkage that led to the volumetric change. Around 1% volumetric change for Example 5a was measured, a 2.8% change for PETG, and no changes for Tritan and SAN were noted.

The thick walled PETG parts showed initial deformations and shrinkage during the first 5 cycles on top as well as the bottom rack, whilst Example 5a showed no deformation in the top rack and only slight shrinkage after 15 cycles in the bottom rack. The greater weight of the parts lead to some marks where contact with prongs occurred with PETG starting in cycle 3, and the same marks were first noted with Example 5a after cycle 20. No dimensional changes or marking was noted for TX1000 or SAN during the 50 cycles with exception of one SAN mug on the bottom rack which also showed some marking after 50 cycles.

Example 7 (Continuous Process with Ti/P)

A continuous melt phase process was employed to produce a random copolyester where DMT was fed into the process molten along with a total molar diol excess comprised of EG and TMCD. Titanium catalyst and optionally, manganese catalysts were added at the beginning of the process. Additives, such as toners and P stabilizer were added after ester-exchange was complete. The process was a 3-stage synthesis consisting of ester exchange, followed by pre-polymer, and concluded with polycondensation to high molecular weight. Ester-exchange was accomplished in a series of CSTR reactors where temperature was increased and pressure decreased to react the DMT with EG/TMCD and liberate methanol. The temperature was gradually increased from about 225° C. to about 250° C. across the reactors with a concurrrent decrease in pressure from about 50 psig to about 5 psig. The reaction product was further reacted in a second stage CSTR reactors starting at a slight vacuum and a temperature of about 250° C. and continuing to higher vacuum down to about 150 mm Hg and about 270° C. All the CSTR reactors were stirred with a single shaft agitator running at less than 100 rpm. The product from the second stage was then reacted in continuous polycondensation reactors for final molecular weight build-up under high vacuum and temperatures starting at about 270° C. to about 280° C. Molten rods were extruded into a water bath and fed to a cutter to make pellets of the finished polyester. Inherent viscosity (IhV) as measured in a solution of 0.5 grams in 100 ml of a 60/40 solution of phenol/tetrachloroethane yielded a value of about 0.65 dl/g for the finished polyester having a glycol component containing about 23-25 mole % TMCD, about 75-77 mole % EG, and less than 2 mole % diethylene glycol, residues.

Example 8 (Continuous Process with Ti/Mn/P)

A continuous melt phase process was employed to produce a random copolyester where DMT was fed into the process molten along with a total molar diol excess comprised of EG and TMCD. Titanium and manganese catalysts were added at the beginning of the process. Additives, such as toners and P stabilizer were added after ester-exchange was complete. The process was a 3-stage synthesis consisting of ester exchange, followed by pre-polymer, and concluded with polycondensation to high molecular weight. Ester-exchange was accomplished in a series of CSTR reactors where temperature was increased and pressure decreased to react the DMT with EG/TMCD and liberate methanol. The temperature was gradually increased from about 225° C. to about 250° C. across the reactors with a concurrrent decrease in pressure from about 50 psig to about 5 psig. The reaction product was further reacted in a second stage CSTR reactors starting at a slight vacuum and a temperature of about 250° C. and continuing to higher vacuum down to about 150 mm Hg and about 270° C. All the CSTR reactors were stirred with a single shaft agitator running at less than 100 rpm. The product from the second stage was then reacted in continuous polycondensation reactors for final molecular weight build-up under high vacuum and temperatures starting at about 270° C. to about 280° C. Molten rods were extruded into a water bath and fed to a cutter to make pellets of the finished polyester. Inherent viscosity (IhV) as measured in a solution of 0.5 grams in 100 ml of a 60/40 solution of phenol/tetrachloroethane yielded a value of about 0.59 dl/g for the finished polyester having a glycol component containing about 33-36 mole % TMCD, about 62-66 mole % EG, and less than 2 mole % diethylene glycol, residues.

Example 9 (Chemical Resistance Testing—Sunscreen)

An outer shell of a dual wall tumbler was utilized for testing as a part representative of drinkware used by customers. Each material tested was molded using the same injection molding equipment and mold. The wall thickness of the molded part was approx. 2 mm. The materials examined were as follows: (1) Tritan TX1000 (from Eastman), (2) Example 5b, (3) Example 5c; polycarbonate PC 2658 (from Covestro); and styrene acrylonitrile copolymer SAN Lustran 31 (from Ineos). The tumbler outer was divided into 4 sections using a marker, and each section was then divided into 6, creating 24 sections total. Four different people each applied one of the following sunscreens: Banana Boat SPF 30 Sport Spray, Banana Boat SPF 50 Sport Spray, Coppertone Kids SPF 50 spray, and Banana Boat SPF 100 Sport Lotion. The sunscreen was applied to their hands and rubbed in completely as if applying sunscreen during normal everyday usage. Each person then used a thumb or finger and touched the cup in a designated section for their sunscreen 0, 1, 2, 3, 4, and 5 minutes after application. The cups were then placed outside in the sun (27° C.) for 10, 30, or 60 minutes. Each cup was then washed once in a commercial dishwasher, an Ecolab conveyor EC44 system using Ecolab Solid Power XL detergent and Ecolab Solid Brilliance rinse aid with a wash temperature of 80-82° C. and a rinse temperature of 90-92° C. After washing all cups were air dried at room conditions for 24 h and then visually reviewed for any residual sunscreen marks. The marks were graded on the following scale: nothing visible (N), just barely visible (JB), barely visible (B), slightly visible (S), visible (V), and very visible (VV), where nothing visible looked the best and very visible looked the worst. The results are provided below in table 6.

Example 10 (Chemical Resistance Testing—Citrus)

An outer shell of a dual wall tumbler was utilized for testing as a part representative of drinkware used by customers. Each material tested was molded using the same injection molding equipment and mold. The wall thickness of the molded part was approx. 2 mm. The materials examined were as follows: (1) Tritan TX1000 (from Eastman), (2) Example 5b, (3) Example 5c; polycarbonate PC 2658 (from Covestro); and styrene acrylonitrile copolymer SAN Lustran 31 (from Ineos). Two different people made mojitos in each cup, using the following recipe: Ten fresh mint leaves and ⅛ lime were placed in a cup. A muddler was used to crush the lime and mint leaves to release the mint and lime essential oils and juices. Two tablespoons of white sugar and ⅔ of a lime were added and muddled again to release the lime essential oils and juices. The cup was then filled with ice cubes and 1.5 oz of rum and ½ cup club soda were poured over the ice. The mixture was then stirred and each cup was placed in an over at 50° C. for 30 or 60 minutes. Cups were then removed from the oven, the mojito was removed and the cups were washed once in a commercial dishwasher, an Ecolab conveyor EC44 system using Ecolab Solid Power XL detergent and Ecolab Solid Brilliance rinse aid with a wash temperature of 80-82° C. and a rinse temperature of 90-92° C. After washing all cups were air dried at room conditions for 24 h and then visually reviewed for any residual essential oil marks. The marks are

TABLE 6

Exposure to Sunscreen.

| Material Tested | Time in Sun/ Time Since Sunscreen Application | Banana Boat 30 SPF Sport Spray | | | Banana Boat 50 SPF Sport Spray | | | Coppertone Kids SPF 50 Spray | | | Banana Boat SPF 100 Sport Lotion | | |
|---|---|---|---|---|---|---|---|---|---|---|---|---|---|
| | | 10 min | 30 min | 60 min | 10 min | 30 min | 60 min | 10 min | 30 min | 60 min | 10 min | 30 min | 60 min |
| Copolyester TX1000 | 0 | S | B | V | B | S | V | V | V | V | VV | VV | V |
| | 1 | S | B | JB | S | S | V | V | V | V | VV | V | V |
| | 2 | B | JB | V | S | S | S | S | V | V | V | V | — |
| | 3 | S | JB | — | S | S | S | V | V | V | V | VV | V |
| | 4 | S | JB | B | JB | S | B | V | V | V | V | S | B |
| | 5 | JB | JB | B | B | B | B | B | V | V | S | V | S |
| Copolyester Ex 5b | 0 | N | N | N | JB | JB | B | B | B | S | V | V | V |
| | 1 | N | N | N | JB | B | B | B | N | B | V | V | V |
| | 2 | N | N | N | N | JB | N | B | B | B | V | B | V |
| | 3 | N | N | N | N | N | N | B | B | B | V | S | V |
| | 4 | N | N | N | N | N | N | B | B | B | S | S | V |
| | 5 | N | N | N | N | N | N | B | B | JB | S | S | S |
| Copolyester Ex 5c | 0 | JB | N | JB | JB | B | JB | V | B | S | V | V | V |
| | 1 | N | N | JB | JB | JB | B | V | B | B | V | V | V |
| | 2 | N | N | N | JB | N | B | S | B | B | V | V | V |
| | 3 | N | N | N | N | N | JB | S | B | S | V | S | V |
| | 4 | N | N | N | N | N | JB | S | B | B | V | V | S |
| | 5 | N | N | N | N | N | JB | S | B | B | S | V | B |
| PC | 0 | JB | JB | S | B | B | JB | B | S | B | V | V | V |
| | 1 | N | N | N | B | B | JB | B | S | S | V | V | V |
| | 2 | N | N | N | JB | JB | JB | B | B | S | S | V | V |
| | 3 | N | N | N | N | N | JB | B | B | B | V | V | V |
| | 4 | N | N | JB | N | N | JB | B | B | S | V | V | V |
| | 5 | N | N | JB | N | N | JB | JB | B | S | V | V | V |
| SAN | 0 | B | JB | JB | JB | B | B | S | S | S | V | V | V |
| | 1 | N | S | JB | S | B | B | S | S | V | V | V | V |
| | 2 | B | B | — | B | N | JB | V | B | S | B | V | V |
| | 3 | JB | N | JB | JB | N | N | S | S | — | S | V | V |
| | 4 | N | N | JB | N | JB | N | S | V | S | V | — | V |
| | 5 | N | N | JB | N | N | N | B | B | B | S | V | V |

A review of table 6 reveals that copolyester (2) Ex 5b generally had better sunscreen resistance compared to copolyester (2) Ex 5c for the sunscreens tested.

typically seen as material pitting, and appear hazy and/or white to the eye. Marks were graded on the following scale: nothing visible (N), just barely visible (JB), barely visible (B), slightly visible (S), visible (V), and very visible (VV), where nothing visible looked the best and very visible looked the worst. The process was repeated 7 times for each cup and the results are provided below in tables 7 and 8.

TABLE 7

30 minute exposure to Citrus

| Exposure Number/<br>Material Type | 1 | 2 | 3 | 4 | 5 | 6 | 7 |
|---|---|---|---|---|---|---|---|
| Copolyester TX1000 | B | S | V | V | V | V | VV |
| Copolyester EX 5b | JB | JB | B | B | S | S | V |
| Copolyester EX 5c | B | B | S | S | S | V | V |
| Copolyester PETG | JB | B | B | B | S | S | V |
| SAN | B | S | V | V | V | V | VV |
| PC | JB | JB | B | B | S | V | V |

TABLE 8

60 minute exposure to Citrus

| Exposure Number/<br>Material Type | 1 | 2 | 3 | 4 | 5 | 6 | 7 |
|---|---|---|---|---|---|---|---|
| Copolyester TX1000 | B | S | V | V | V | V | VV |
| Copolyester EX 5b | B | B | S | S | S | V | V |
| Copolyester EX 5c | B | B | S | S | V | V | VV |
| Copolyester PETG | B | S | S | S | S | V | V |
| SAN | S | S | V | V | V | VV | VV |
| PC | B | S | S | S | S | V | V |

A review of tables 7 and 8 reveals that copolyester (2) EX 5b generally had better citrus resistance compared to copolyester (3) EX 5c for both the 30 and 60 minute tests.

Example 11 (Spiral Flow Testing)

A Toyo 110 injection molding machine fitted with a spiral flow mold was used to conduct the material flow comparisons. The spiral flow mold cavity dimensions were 0.5" wide×0.125" thick×60.0" long with marks indicating flow length spaced at 0.25" intervals. The materials tested were copolyesters having the following monomer residues: (1) TX1000 (from Eastman), (2) Example 5b, (3) Example 5c, and (4) PETG (from Eastman). The materials were dried prior to molding using desiccant drying conditions to less than 200 ppm moisture as confirmed by Karl Fisher analysis.

Temperature settings were adjusted to include typical processing conditions for each of the materials studied. Once the set barrel and nozzle temperatures reached equilibrium, material was purged by increasing back pressure to 500 psi to prevent the screw from recovering and allowing the material to freely flow from the nozzle while turning the screw at 150 rpm. After purge was completed, the back-pressure was decreased to 100 psi and the sled was moved forward until the nozzle coupled with the sprue bushing. The screw was then turned until a complete shot was loaded and the machine was placed in auto cycle.

Screw speed (150 rpm) and back pressure (100 psi) were kept constant for each of the experiments. An injection speed of 1 inch/second was constant along with injection pressures of 1000 psi and 1250 psi. Mold temperature was kept constant at 80° F. along with a cooling time of 22 seconds. The actual cycle time was kept constant at 38.4 seconds. Shot cushion was adjusted with each parameter change to remain between 0.05" and 0.10". The small cushion allowed reproducible results by keeping the melt temperature uniform.

Once the parameters were input, the molding machine was placed in auto cycle and shots were discarded until the desired cushion was achieved. Ten shots were then collected and flow length was measured, averaged and recorded for each material and each condition. The results are shown in FIGS. 1 and 2.

Figure 2:
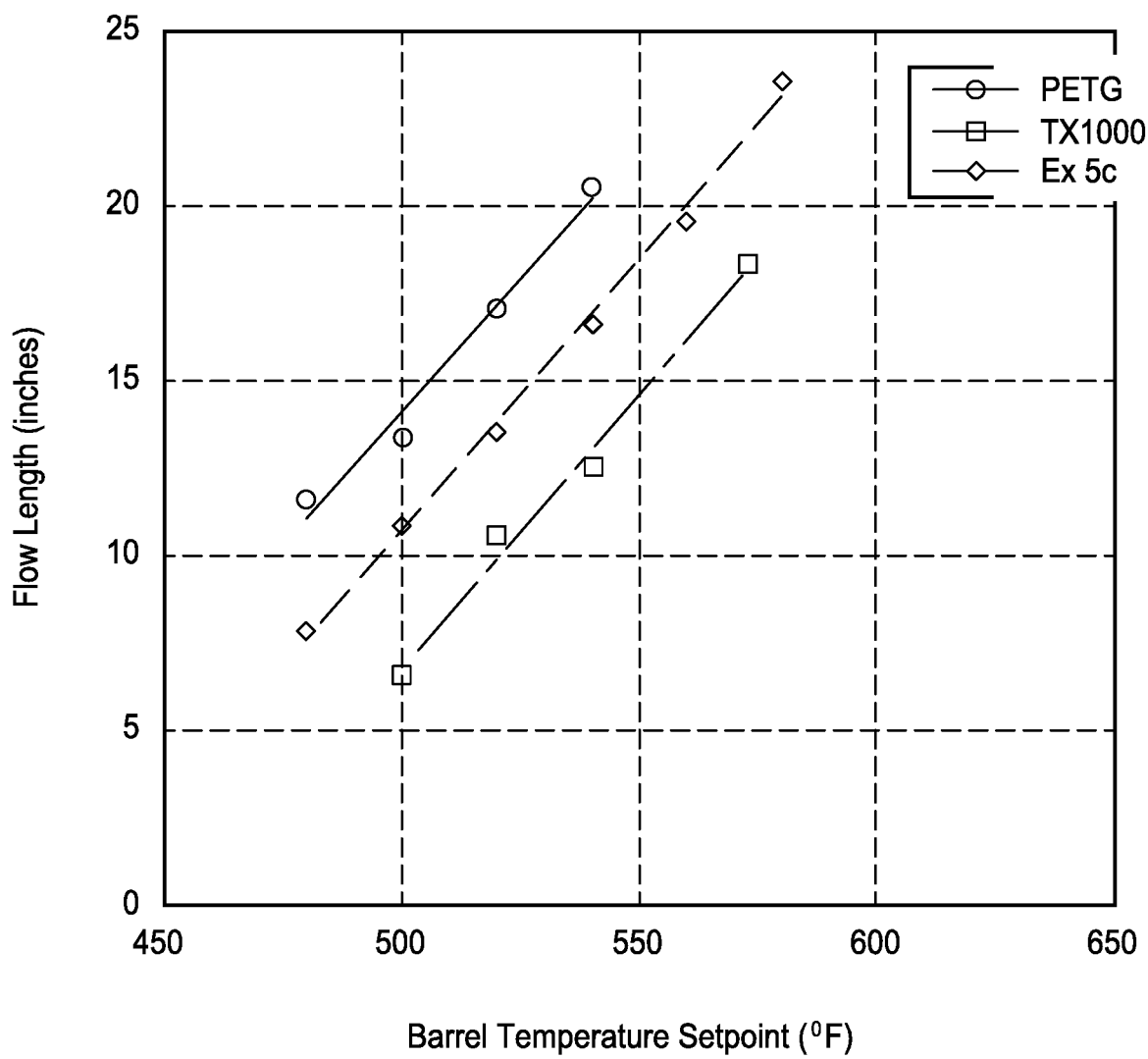
FIG. 2 is a graph depicting flow length as a function of barrel temperature for different polymer compositions in accordance with spiral flow testing in Example 11.

A review of FIGS. 1 and 2 reveals that copolyester (2) EX 5b had better spiral flow compared to copolyester (3) EX 5c at a given temperature. Thus, in one embodiment, the polyester composition according to the invention has a spiral flow length of greater than 38 cm (15 inches) at a temperature of 271° C. (520° F.), measured in accordance with this Example 11.

Example 12 (Weld Strength Testing)

I-beam shaped parts were molded and used to test the weld strength of an ultrasonic weld for the following materials: Example 7, Example 8, TX1000 (from Eastman), TX2000 (from Eastman), SAN (from Ineos), and PC 2658 (from Covestro).

All materials were used to injection mold I-beam sytle parts. The parts were made using a Toyo Plastar Si-110 Electric Injection Molding Machine model year 2000. The machine had a clamp tonnage of 110 and a shot size of 3.42 ounces. The machine was equipped with a general purpose screw. The machine was used to mold I-beam style parts for each material listed in table 8. The I-beams were molded at varying, optimal conditions for each material to ensure a quality part. The conditions used are shown below in Tables 9 and 10.

TABLE 9

Molding conditions for each material forming I-beam parts.

| Mat'l | Tg ° C. | Barrel Set ° F. | Nozzle Set ° F. | Melt Temp ° F. | Mold Set ° F. | Inject | Pack | Hold | Screw Recover (sec) | Actual Cycle Time | Screw Speed (RPM) |
|---|---|---|---|---|---|---|---|---|---|---|---|
| Ex. 7 | 93 | 500 | 500 | 524 | 100 | 1800/12 | 1500/6 | 1000/8 | 8.52 | 37.8 | 150 |
| TX1000 | 108 | 520 | 520 | 560 | 100 | 1800/12 | 1500/6 | 1000/8 | 8.47 | 37.8 | 150 |
| TX2000 | 118 | 520 | 520 | 562 | 100 | 1800/12 | 1500/6 | 1000/8 | 8.11 | 38.33 | 150 |
| Ex. 8 | 105 | 520 | 520 | n/a | 100 | 1800/12 | 1500/6 | 1000/8 | 8.27 | 37.8 | 150 |
| SAN | 105 | 450 | 450 | n/a | 130 | 1200/12 | 800/6 | 800/6 | n/a | n/a | 150 |
| PC 2658 | 150 | 570 | 570 | n/a | 170 | 1800/12 | 1400/6 | 1000/6 | 8.44 | 33.6 | 150 |

TABLE 10

Molding conditions Cont.

| Mat'l | Back press (PSI) | Peak Inject Press | Actual Fill Time (sec) | Cushion (in) | Cooling Time (sec) | Screw Position | 4 V | 3 V | 2 V | 1 V |
|---|---|---|---|---|---|---|---|---|---|---|
| Ex. 7 | 100 | 1769 | n/a | 0.203 | 14 | 3.6 | 3.6/1 | 2/.75 | 0.75/2 | 0.28/1 |
| TX1000 | 100 | 1801 | 2.93 | 0.247 | 14 | 3.6 | 3.6/1 | 2/.75 | 0.75/2 | 0.28/1 |
| TX2000 | 100 | 1800 | 3.37 | 0.278 | 14 | 3.6 | 3.6/1 | 2/1 | 0.75/2 | 0.28/1 |
| Ex. 8 | 100 | 1800 | 2.75 | 0.282 | 14 | 3.6 | 3.6/1 | 2/1 | 0.75/2 | 0.28/1 |
| SAN | 100 | n/a | n/a | n/a | n/a | 3.6 | 3.6/1 | n/a | 0.75/2 | 0.28/1 |
| PC 2658 | 100 | 1755 | 2.56 | 0.282 | 12 | 3.6 | 3.6/1 | 2/2 | 0.75/2 | 0.28/1 |

The welding process involved taking two separate parts of the same material and allowing them to be welded together. In order to make a successful weld, several parameters had to be set, checked, and adjusted to ensure the integrity of the part and weld. Welds were made to half I-beams with an energy director to the half I-beam with a surface texture. The welds, of all materials, were based upon a set distance allowing for a consistent, reproducible weld. The welds were performed with a Dukane iQ "Melt Match" (15 kHz 4800 Watts) welder. The I-beams were welded at 50% weld amplitude, a trigger force of 75 psi, and a distance of 0.12 inches. The amount of energy applied to each material varied based upon what each material allowed at that set distance.

The process to test weld strength used an MTS Insight electromechanical 10 kN standard length machine. The standard preset I-beam conditions were selected, dialed in, and then secured to ensure consistency for each part. I-beams were placed inside the grips of the machine and then the machine was allowed to pull the I-beam apart. The machine slowly applied force by pulling each side of the welded beam until it separated. As it pulled the pieces apart, causing stress on the weld, the machine documented the amount of force required to break the weld. After the weld is broken, additional I-beams were tested to receive an average. The average was then analyzed and compared to the other materials tested. The results are shown in FIGS. 3 and 4.

Figure 3:
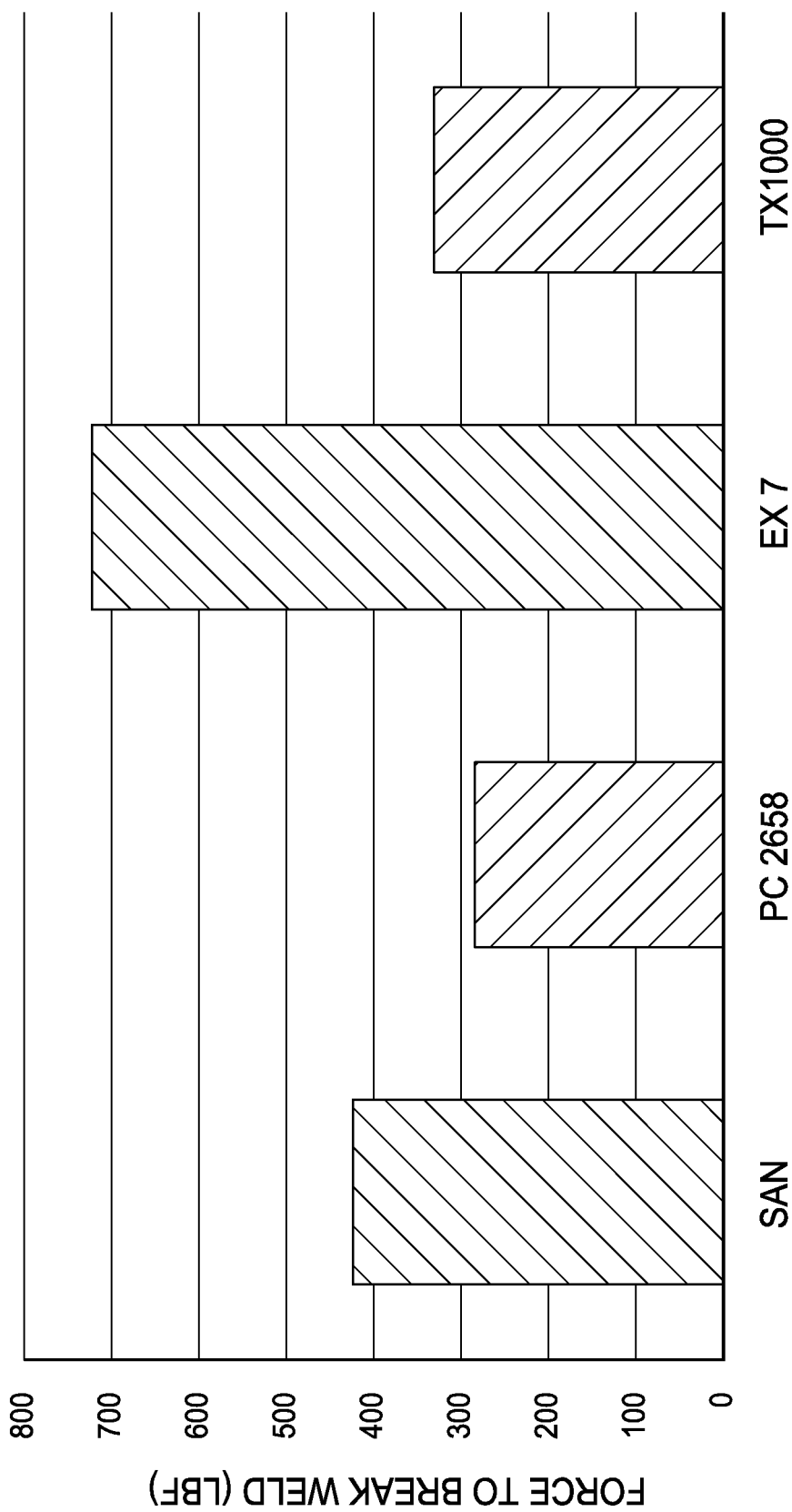
FIG. 3 is a graph depicting the force to break a weld for different polymer compositions in accordance with weld strength testing in Example 12.
Figure 4:
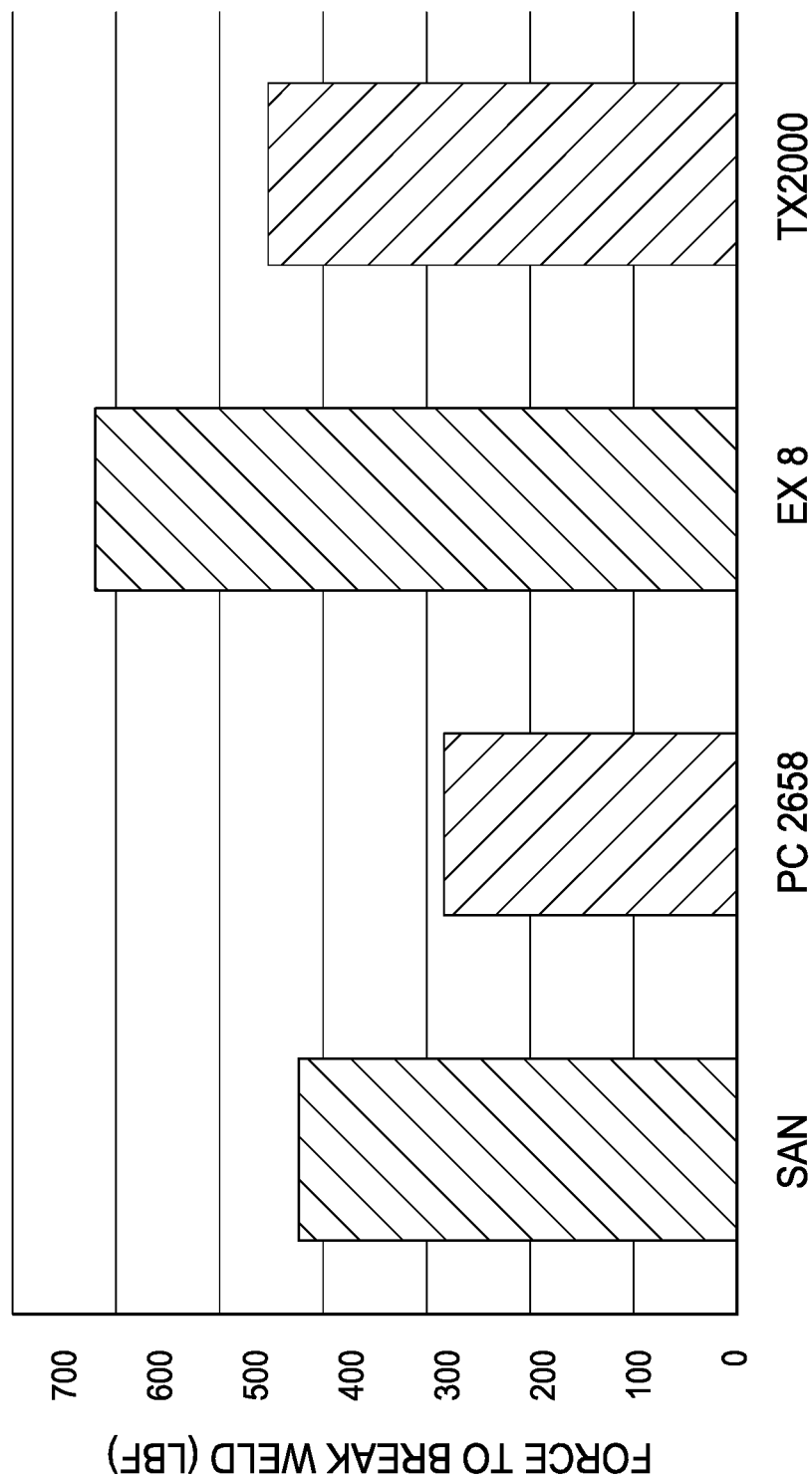
FIG. 4 is a graph depicting the force to break a weld for different polymer compositions in accordance with weld strength testing in Example 12.

A review of FIGS. 3 and 4 reveals that the copolyesters according to Examples 7 and 8 had higher weld strength that the other materials and the Example 7 material had higher weld strength than Example 8 material.

Example 13 (Thermal Stability Testing)

Thermal stability testing was conducted on the following 4 materials: Example 5b copolyester, Example 5c copolyester, TX1000 and PETG. A Toyo 110 injection molding machine fitted with a 4"×4" single cavity cold runner plaque mold was used to conduct thermal stability studies. Four temperature settings (480° F., 520° F., 560° F., and 600° F.) and four polymer melt residence times (2 min, 3 min, 5 min, and 10 min) were applied to each of the materials tested. Barrel capacity of the Toyo 110 was determined to be ~3 shots of one 4"×4" plaque and cold runner. Polymer melt residence times were adjusted by increasing the cooling time, allowing the chosen melt residence times to be achieved. Screw speed (125 rpm) and back pressure (100 psi) were kept constant for each of the experiments.

Once the set barrel and nozzle temperatures had reached equilibrium, material was purged by increasing back pressure to 500 psi to prevent the screw from recovering and allowing the material to freely flow from the nozzle while turning the screw at 125 rpm. After purge was completed, the back-pressure was decreased to 100 psi and the sled was moved forward until the nozzle coupled with the sprue bushing. The screw was then turned until a complete shot was loaded and the machine was placed in auto cycle. The first 5 shots molded at each condition were discarded. The next 5 shots were retained and numbered in order of molding. After collecting the 5th shot at each molding condition, the sled was reversed and the next shot was injected into a five ounce paper cup and a melt temperature was recorded by inserting a thermocouple into the molten polymer, stirring as quickly as possible and recording the highest temperature observed. The sled was left in the reverse position, cycle time or temperature was then adjusted and the procedure was repeated until all the planned times and temperatures were achieved. The collected parts were submitted for IV and GPC analyses. The results are shown in FIGS. 5-7.

Figure 5:
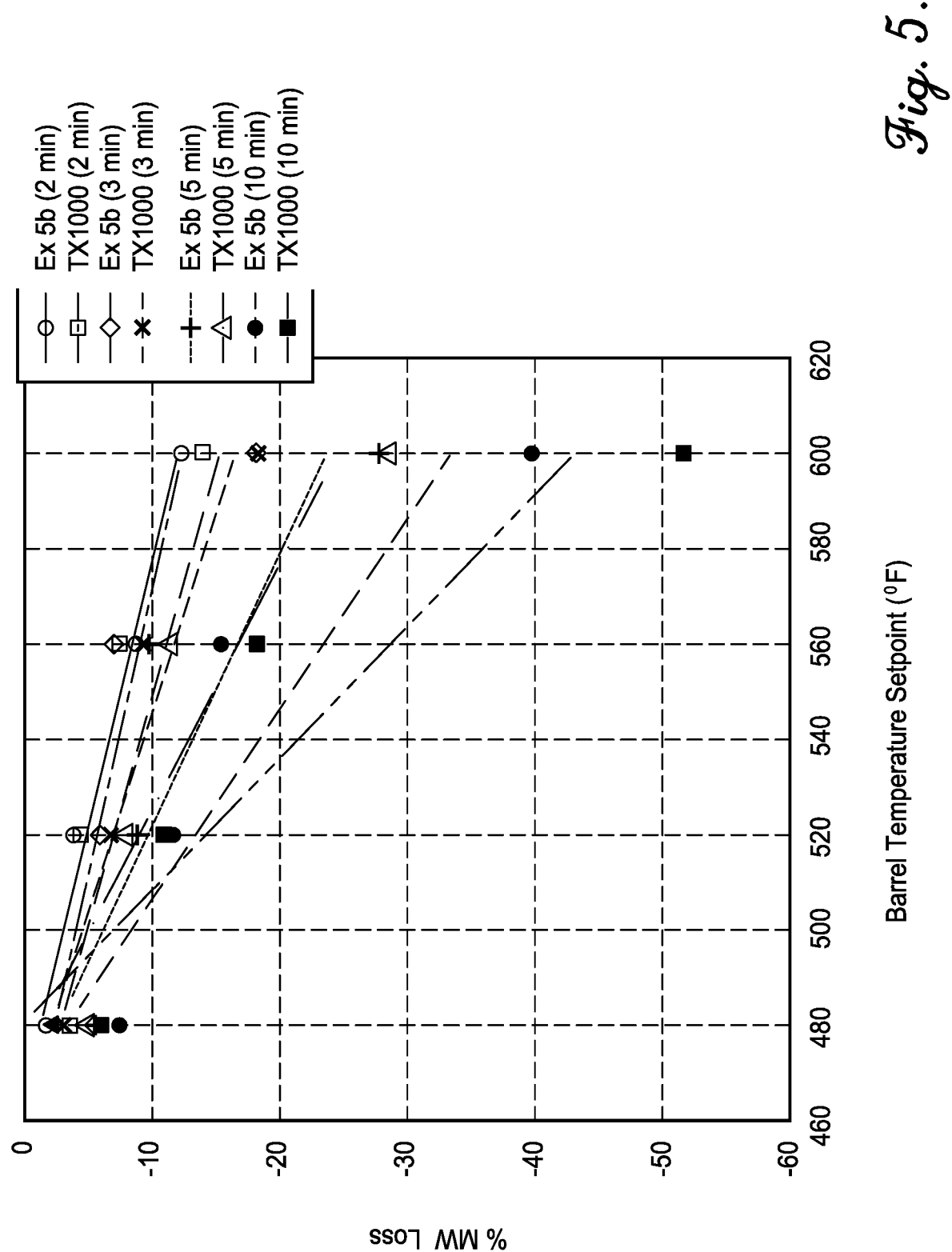
FIG. 5 is a graph depicting molecular weight loss as a function of barrel temperate and residence time for different polymer compositions in accordance with thermal stability testing in Example 13.
Figure 6:
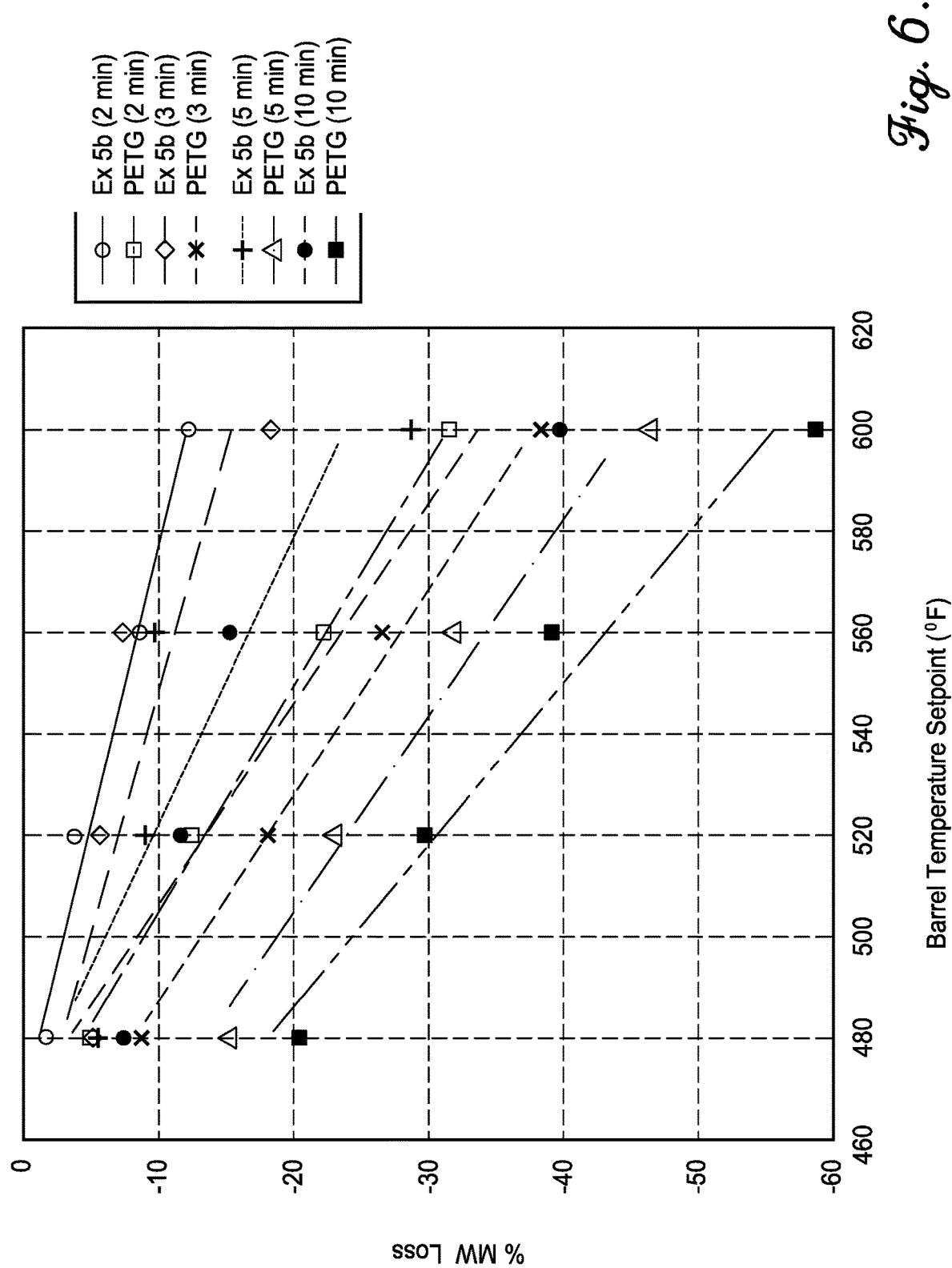
FIG. 6 is a graph depicting molecular weight loss as a function of barrel temperate and residence time for different polymer compositions in accordance with thermal stability testing in Example 13.
Figure 7:
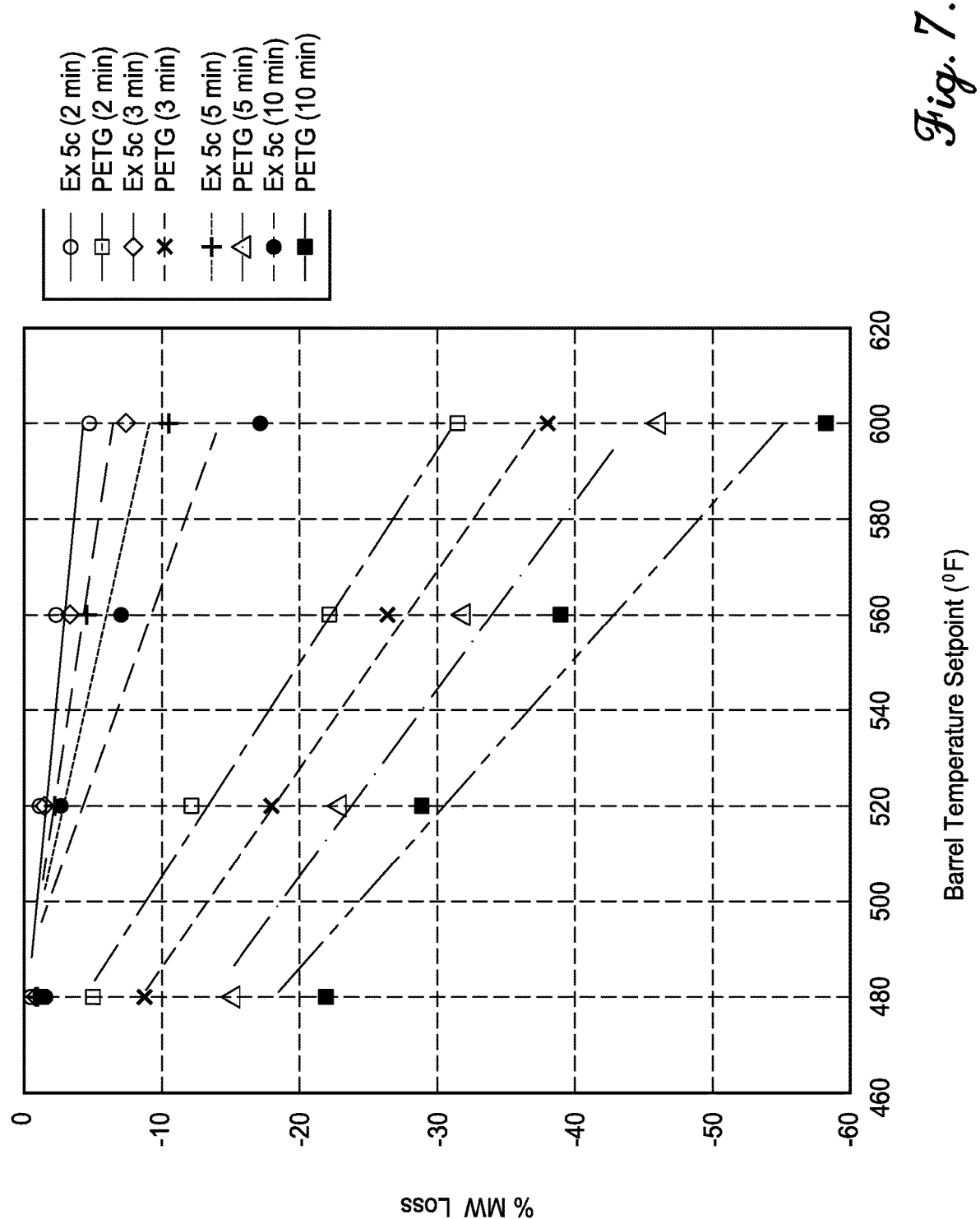
FIG. 7 is a graph depicting molecular weight loss as a function of barrel temperate and residence time for different polymer compositions in accordance with thermal stability testing in Example 13.

A review of FIGS. 5-7 reveals that the Example 5c material had better thermal stability than Example 5b material. Thus, in certain embodiments, the polyester compositions according to invention have less than 10% loss in inherent viscosity after being held at a temperature of 293° C. (560° F.) for 2 minutes. In certain embodiments, the polyester compositions according to invention have less than 15% loss in inherent viscosity after being held at a temperature of 271° C. (520° F.) for 10 minutes.

What is claimed is:

1. A polyester composition comprising at least one polyester which comprises:
   (a) a dicarboxylic acid component comprising:
      about 90 to about 100 mole % of terephthalic acid residues;
      (ii) about 0 to about 10 mole % of aromatic and/or aliphatic dicarboxylic acid residues having up to 20 carbon atoms; and
   (b) a glycol component comprising:
      (i) about 10 to about 27 mole % 2,2,4,4-tetramethyl-1,3-cyclobutanediol residues; and
      (ii) about 73 to about 90 mole % ethylene glycol residues; and
   wherein the total mole % of the dicarboxylic acid component is 100 mole %, and
   wherein the total mole % of the glycol component is 100 mole %;
   wherein the inherent viscosity of the polyester is from 0.50 to 0.8 dL/g as determined in 60/40 (wt/wt) phenol/tetrachloroethane at a concentration of 0.25 g/50 ml at 25° C.; and
   wherein the L* color values for the polyester is greater than 90, as determined by the L*a*b* color system measured following ASTM D 6290-98 and ASTM E308-99, using measurements from a Hunter Lab Ultrascan XE Spectrophotometer with the following parameters: (1) D65 illuminant, (2) 10 degree observer, (3) reflectance mode with specular angle included, (4) large area view, (5) 1" port size, and where the measurements were performed on polymer granules ground to pass a 1 mm sieve; further comprising: (c) a catalyst/stabilizer component which comprises: (i) titanium atoms in the range of 10-50 ppm based on polymer weight, and (iii) phosphorus atoms in the range of 10-200 ppm based on polymer weight.

2. The polyester composition of claim 1, wherein the catalyst/stabilizer component comprises tin atoms in the range of 0-5 ppm based on polymer weight.

3. The polyester composition of claim 2, wherein the catalyst/stabilizer component comprises no tin atoms.

4. The polyester composition of claim 1, wherein 2,2,4,4-tetramethyl-1,3-cyclobutanediol is present in the amount of about 20 to about 25 mole %.

5. The polyester composition of claim 1, wherein the inherent viscosity of the polyester is from 0.60 to 0.70 dL/g.

6. The polyester composition of claim 1, wherein the polyester has a $T_g$ of 90 to 96° C.

7. The polyester composition of claim 1, wherein the 2,2,4,4-tetramethyl-1,3-cyclobutanediol residues is a mixture comprising about 55 to about 65 mole % of cis-2,2,4,4-tetramethyl-1,3-cyclobutanediol residues and about 35 to about 45 mole % of trans-2,2,4,4-tetramethyl-1,3-cyclobutanediol residues.

8. The polyester composition of claim 1, wherein the weight ratio of P to total catalyst is from 0.6:1 to 1.2:1.

9. The polyester composition of claim 8, wherein the catalyst/stabilizer component comprises phosphorus atoms in the range of 15-60 ppm based on polymer weight.

10. The polyester composition of claim 9, comprising at least one phosphorus compound chosen from at least one of the following: triaryl phosphates, alkyl diaryl phosphates, and mixed alkyl aryl phosphates.

11. The polyester composition of claim 1, wherein the flexural modulus of the polyester is equal to or of greater than 2000 MPa (290,000 psi).

12. The polyester composition of claim 1, wherein the polyester has a spiral flow length of greater than 38 cm (15 inches) at a temperature of 271° C. (520° F.), in accordance with Example 11.

13. The polyester composition of claim 1, wherein the polyester has a notched Izod impact strength of at least 50 J/m (0.94 ft-lbs/in) at 23° C. according to ASTM D256 with a 10-mil notch using a ⅛-inch thick bar.

14. The polyester composition of claim 1, wherein the polyester has two or more of the following properties chosen from: a $T_g$ of from about 90 to about 96° C. as measured by a TA 2100 Thermal Analyst Instrument at a scan rate of 20° C./min; a flexural modulus at 23° C. of greater than 2000 MPa (290,000 psi) as defined by ASTM D790; a notched Izod impact strength greater than 50 J/m (0.94 ft-lbs/in) according to ASTM D256 with a 10-mil notch using a ⅛-inch thick bar at 23° C.; and a spiral flow length of greater than 38 cm (15 inches) at a temperature of 271° C. (520° F.), in accordance with Example 11.

15. The polyester composition of claim 1, wherein the b* color values for the polyesters useful in the invention is from −12 to less than 5 as determined by the L*a*b* color system.

* * * * *